(12) United States Patent
Hayashi et al.

(10) Patent No.: US 6,657,765 B2
(45) Date of Patent: Dec. 2, 2003

(54) OPTICAL DEFLECTING UNIT, OPTICAL SCANNING UNIT, IMAGE FORMING APPARATUS, AND METHOD OF PRODUCING OPTICAL UNIT

(75) Inventors: Yoshinori Hayashi, Kanagawa (JP); Eiji Mochizuki, Kanagawa (JP); Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/085,707

(22) Filed: Mar. 1, 2002

(65) Prior Publication Data

US 2002/0163704 A1 Nov. 7, 2002

(30) Foreign Application Priority Data

| Mar. 1, 2001 | (JP) | 2001-056407 |
| Mar. 14, 2001 | (JP) | 2001-073032 |
| Mar. 14, 2001 | (JP) | 2001-073033 |
| Mar. 14, 2001 | (JP) | 2001-073034 |
| Mar. 19, 2001 | (JP) | 2001-078152 |

(51) Int. Cl.[7] ............................................. G02B 26/08
(52) U.S. Cl. ................. 359/225; 359/214; 359/215; 359/223; 347/259; 347/260
(58) Field of Search ................. 359/198–199, 359/212–215, 223–225, 900; 347/241–243, 256–260

(56) References Cited

U.S. PATENT DOCUMENTS

| 4,726,640 A | 2/1988 | Iwama et al. |
| 5,017,987 A | 5/1991 | Nanjoh et al. |
| 5,069,515 A | 12/1991 | Itami et al. |
| 5,108,843 A | 4/1992 | Ohtaka et al. |
| 5,136,415 A | * 8/1992 | Bean ........................... 359/213 |
| 5,304,357 A | 4/1994 | Sato et al. |
| 5,408,113 A | 4/1995 | Kanno et al. |
| 5,448,113 A | 9/1995 | Suzuki et al. |
| 5,453,650 A | 9/1995 | Hashimoto et al. |
| 5,508,447 A | 4/1996 | Kato |
| 5,510,664 A | 4/1996 | Suzuki et al. |
| 5,574,591 A | 11/1996 | Suzuki et al. |
| 5,606,448 A | 2/1997 | Suzuki et al. |
| 5,612,599 A | 3/1997 | Itami et al. |
| 5,633,523 A | 5/1997 | Kato |
| 5,668,413 A | 9/1997 | Nanjo |
| 5,726,699 A | 3/1998 | Itami et al. |
| 5,739,602 A | 4/1998 | Suzuki et al. |
| 5,751,465 A | * 5/1998 | Melville et al. ............ 359/213 |
| 5,769,544 A | 6/1998 | Suzuki et al. |
| 5,786,594 A | 7/1998 | Ito et al. |
| 5,811,353 A | 9/1998 | Nanjo |

(List continued on next page.)

FOREIGN PATENT DOCUMENTS

| JP | 2-207214 | 8/1990 |
| JP | 2-250023 | 10/1990 |
| JP | 4-052618 | 2/1992 |
| JP | 4-080709 | 3/1992 |
| JP | 4-096014 | 3/1992 |
| JP | 7-175005 | 7/1995 |
| JP | 11-052278 | 2/1999 |

*Primary Examiner*—James Phan
(74) *Attorney, Agent, or Firm*—Oblon, Spivak, McClelland, Maier & Neustadt, P.C.

(57) ABSTRACT

An optical deflecting unit includes a torsion mirror which is pivotable about an axis and has a deflecting reflection surface which receives a light beam at an incident angle inclined with respect to a plane which is perpendicular to the axis and the deflecting reflection surface, and at least one fixed mirror surface confronting the torsion mirror and arranged so that the light beam is reflected between the torsion mirror and the at least one fixed mirror surface a plurality of times. A moving direction of a reflection position of the light beam on the torsion mirror in a sub scan direction reverses.

24 Claims, 27 Drawing Sheets

U.S. PATENT DOCUMENTS

| | | |
|---|---|---|
| 5,909,966 A | 6/1999 | Suzuki et al. |
| 5,936,756 A | 8/1999 | Nakajima |
| 5,969,844 A | 10/1999 | Itami et al. |
| 5,999,345 A | 12/1999 | Nakajima et al. |
| 6,052,211 A | 4/2000 | Nakajima |
| 6,069,724 A | 5/2000 | Hayashi et al. |
| 6,081,386 A | 6/2000 | Hayashi et al. |
| 6,091,534 A | 7/2000 | Nakajima |
| 6,104,522 A | 8/2000 | Hayashi et al. |
| 6,150,698 A | 11/2000 | Ohtsuka et al. |
| 6,150,779 A | 11/2000 | Itami et al. |
| 6,185,026 B1 | 2/2001 | Hayashi et al. |
| 6,198,562 B1 | 3/2001 | Hayashi et al. |
| 6,215,974 B1 | 4/2001 | Katoh et al. |
| 6,229,638 B1 | 5/2001 | Sakai et al. |
| 6,281,609 B1 | 8/2001 | Itami et al. |
| 6,312,108 B1 | 11/2001 | Kato |
| 6,324,149 B1 | 11/2001 | Mifune et al. |
| 6,332,669 B1 | 12/2001 | Kato et al. |
| 6,367,914 B1 | 4/2002 | Ohtaka et al. |
| 6,381,057 B1 | 4/2002 | Itabashi |
| 6,384,949 B1 | 5/2002 | Suzuki |
| 6,388,792 B1 | 5/2002 | Atsuumi et al. |
| 6,400,917 B2 | 6/2002 | Nakazato et al. |
| 6,417,509 B1 | 7/2002 | Atsuumi et al. |
| 6,429,956 B2 | 8/2002 | Itabashi |
| 6,445,482 B1 | 9/2002 | Hayashi |
| 6,448,998 B1 | 9/2002 | Suzuki et al. |
| 6,465,918 B1 | 10/2002 | Itami et al. |
| 6,469,772 B1 | 10/2002 | Itabashi |
| 6,498,617 B1 | 12/2002 | Ishida et al. |

\* cited by examiner

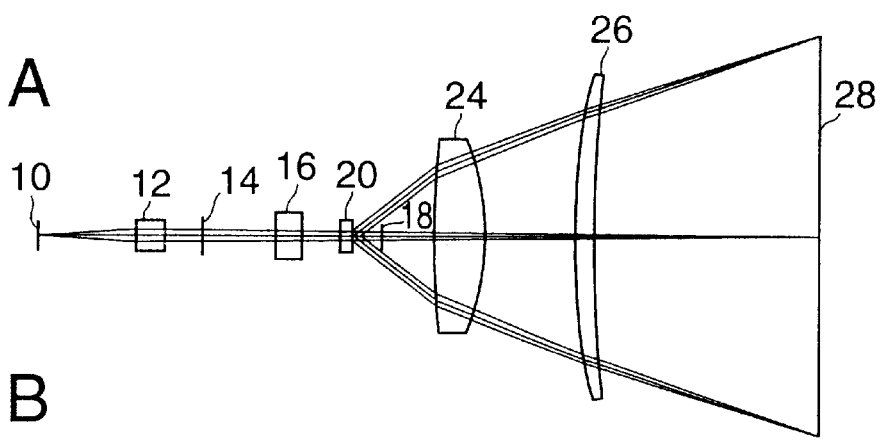
FIG. 1A
FIG. 1B
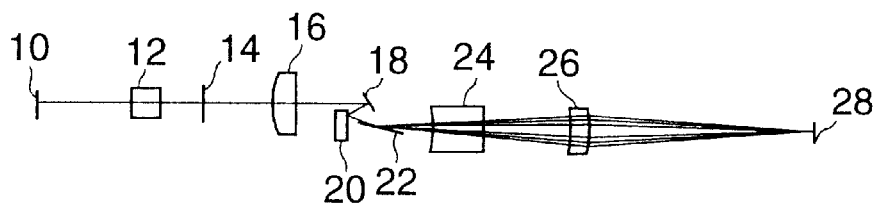
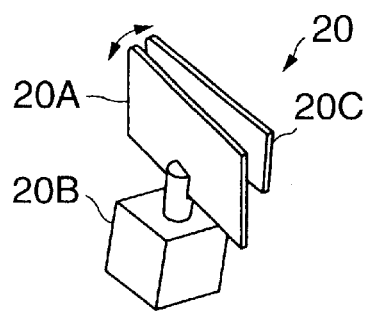
FIG. 2
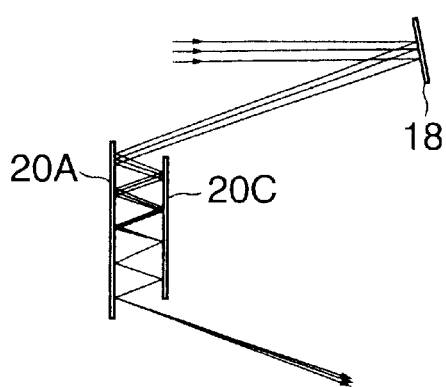
FIG. 3
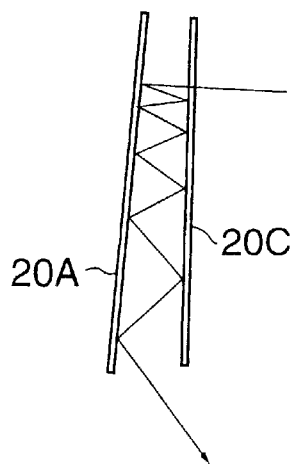
FIG. 4

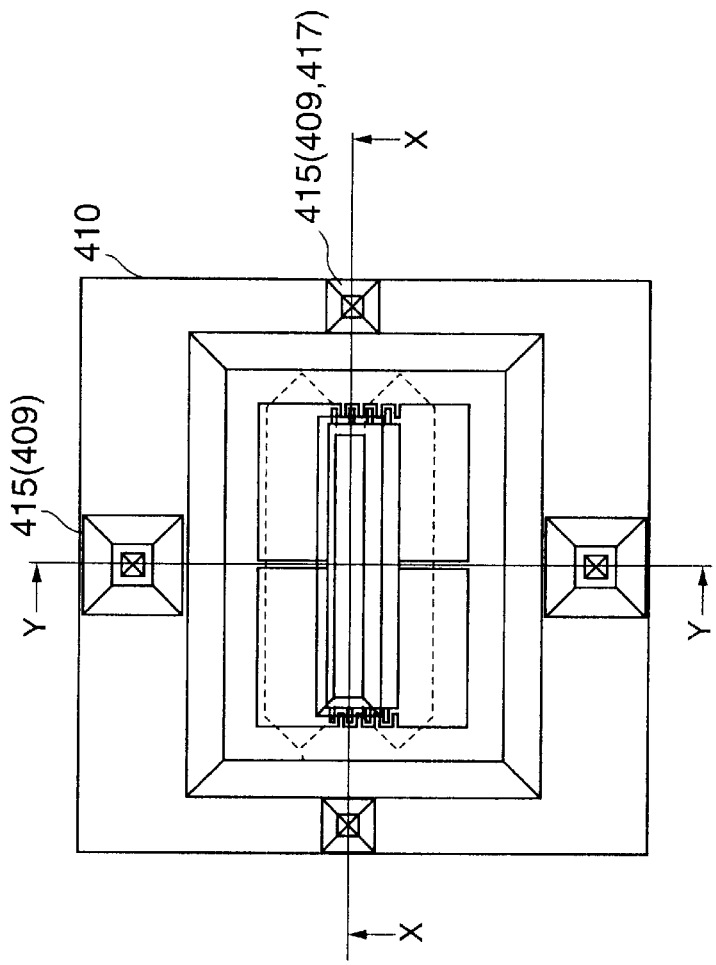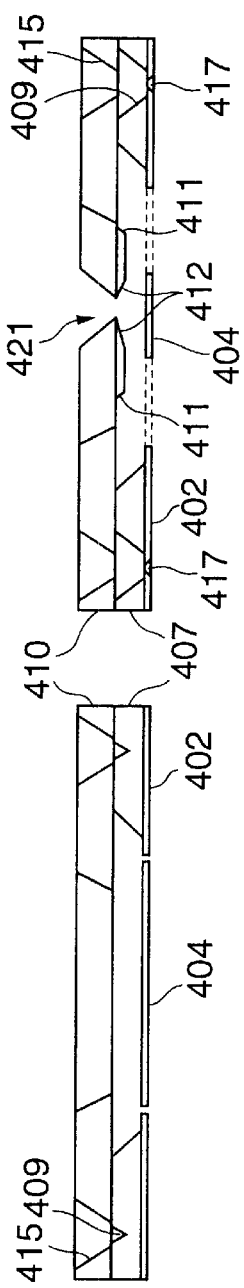

OPTICAL DEFLECTING UNIT, OPTICAL SCANNING UNIT, IMAGE FORMING APPARATUS, AND METHOD OF PRODUCING OPTICAL UNIT

BACKGROUND OF THE INVENTION

This application claims the benefit of Japanese Patent Applications No.2001-056407 filed Mar. 1, 2001, No.2001-073032 filed Mar. 14, 2001, No.2001-073033 filed Mar. 14, 2001, No.2001-073034 filed Mar. 14, 2001, and No.2001-078152 filed Mar. 19, 2001, in the Japanese Patent Office, the disclosure of which is hereby incorporated by reference.

1. Field of the Invention

The present invention generally relates to optical deflecting units, optical scanning units, image forming apparatuses and methods of producing optical units, and more particularly to an optical deflecting unit for deflecting a light beam, an optical scanning unit for making a scan using a light beam, an image forming apparatus which uses such an optical scanning unit, and a method of producing an optical unit such as the optical deflecting unit and the optical scanning unit.

2. Description of the Related Art

An optical scanning unit is used in various kinds of apparatuses, including image forming apparatus such as an optical printer, a digital copying machine and a facsimile machine. In order to improve the performance of the optical scanning unit, there are demands to increase the optical scan speed.

One effective way of increasing the optical scan speed is to employ a multi-beam scan method which optically scans a plurality of scanning lines at one time. Regardless of whether a single beam scan method or the multi-beam scan method is employed, it is possible to increase the optical scan speed by increasing the light beam deflection speed.

For example, the light beam deflection speed can be increased by increasing the rotational speed of a rotary polygonal mirror. However, the increased rotational speed of the rotary polygonal mirror inevitably increases the power consumption, vibration and noise, and deteriorates the durability of-the optical deflecting unit itself.

It is also possible to increase the light beam deflection speed by increasing the number of deflection or mirror surfaces of the rotary polygonal mirror, so as to increasing the number of deflections per revolution of the rotary polygonal mirror. However, if the number of deflection or mirror surfaces is simply increased, the radius of the rotary polygonal mirror inevitably increases. Because the inertia of the rotary polygonal mirror is proportional to the square of the radius of the rotary polygonal mirror, the power consumption required to rotate the rotary polygonal mirror having the large radius inevitably increases.

In order to avoid increasing the power consumption, it is necessary to increase the number of deflection or mirror surfaces of the rotary polygonal mirror without increasing the radius of the rotary polygonal mirror. But in this case, the area of each deflection or mirror surface becomes small, to thereby reduce the deflection angle of the light beam. As a result, it becomes necessary to increase the length of the optical path from the rotary polygonal mirror to the scanning surface, so as to obtain the length of the optical scan region that is required for the optical scan. Consequently, the optical scanning unit becomes large.

Other than the rotary polygonal mirror, there is an optical deflecting unit which uses a torsion mirror. This torsion mirror is sometimes also referred to as a torsional scanning mirror or a torsional resonant mirror. The torsion mirror is combined with a fixed mirror, so as to reflect the light beam a plurality of times between the fixed mirror and the torsion mirror. As a result it is possible to increase the light beam deflection speed and to increase the deflection angle of the light beam. Such an optical deflecting unit which uses the torsion mirror is proposed in a Japanese Laid-Open Patent Application No.4-52618, for example, and for the sake of convenience, the optical deflection method which uses the multiple reflections of the between the fixed mirror and the torsion mirror will hereinafter be referred to as a "multiple reflection deflection" method.

Recently, a micro torsion mirror which makes a sinusoidal pivoting and is capable of making a high-speed deflection has been developed in the field of micromachines. Accordingly, the optical scan speed can be increased by use of such a micro torsion mirror.

However, when the proposed multiple reflection deflection method described above is employed to deflect the light beam, a skew which will be described later is generated in the deflected light beam, to thereby deteriorate the wavefront aberration of the deflected light beam. When the wavefront aberration of the deflected light beam deteriorates, it becomes impossible to satisfactorily form a beam spot having a small diameter on the scanning surface, and a high-density and high-precision optical scan cannot be made.

SUMMARY OF THE INVENTION

Accordingly, it is a general object of the present invention to provide a novel and useful optical deflecting unit, optical scanning unit, image forming apparatus and method of producing optical unit, in which the problems described above are eliminated.

Another and more specific object of the present invention is to provide an optical deflecting unit, optical scanning unit, image forming apparatus and method of producing optical unit, which can realize the multiple reflection deflection with a high light beam deflection speed and a large deflection angle of the light beam, and with an effectively reduced skew of the deflected light beam.

Still another object of the present invention is to provide an optical deflecting unit for deflecting a light beam in a main scan direction, comprising a torsion mirror which is pivotable about an axis and having a deflecting reflection surface which receives the light beam at an incident angle inclined with respect to a plane which is perpendicular to the axis and the deflecting reflection surface; and at least one fixed mirror surface confronting the torsion mirror and arranged so that the light beam is reflected between the torsion mirror and the at least one fixed mirror surface a plurality of times, and a moving direction of a reflection position of the light beam on the torsion mirror in a sub scan direction reverses, the sub scan direction being perpendicular to the main scan direction. According to the optical deflecting unit of the present invention, it is possible to realize the multiple reflection deflection with a high light beam deflection speed and a large deflection angle of the light beam, and with an effectively reduced skew of the deflected light beam.

A further object of the present invention is to provide an optical deflecting unit for deflecting a light beam in a main scan direction, comprising a first substrate pivotally supporting a torsion mirror having a deflecting reflection surface; a second substrate disposed to confront the first substrate, the second substrate having a bonding surface parallel to the first substrate and at least one fixed mirror surface which is inclined in a sub scan direction with respect to the deflecting reflection surface, the sub scan direction being perpendicular to the main scan direction, where the light beam first reaches the deflecting reflection surface and is reflected a plurality of times between the deflecting reflection surface and the at least one fixed mirror surface before being output as a deflected light beam. According to the optical deflecting unit of the present invention, it is possible to realize the multiple reflection deflection with a high light beam deflection speed and a large deflection angle of the light beam, and with an effectively reduced skew of the deflected light beam.

Another object of the present invention is to provide an optical scanning unit for scanning a body by a light beam in a main scan direction, comprising an optical deflecting unit which deflects a light beam in the main scan direction; and a lens system for imaging a deflected light beam from the optical deflecting unit on the body, where the optical deflecting unit comprises a torsion mirror which is pivotable about an axis and having a deflecting reflection surface which receives the light beam at an incident angle inclined with respect to a plane which is perpendicular to the axis and the deflecting reflection surface; and at least one fixed mirror surface confronting the torsion mirror and arranged so that the light beam is reflected between the torsion mirror and the at least one fixed mirror surface a plurality of times, and a moving direction of a reflection position of the light beam on the torsion mirror in a sub scan direction reverses so as to reduce a skew of the deflected light beam, the sub scan direction being perpendicular to the main scan direction. According to the optical scanning unit of the present invention, it is possible to realize the multiple reflection deflection with a high light beam deflection speed and a large deflection angle of the light beam, and with an effectively reduced skew of the deflected light beam.

Still another object of the present invention is to provide an optical scanning unit for scanning a body by a light beam in a main scan direction, comprising an optical deflecting unit which deflects a light beam in the main scan direction; and a lens system for imaging a deflected light beam from the optical deflecting unit on the body, where the optical deflecting unit comprises a first substrate pivotally supporting a torsion mirror having a deflecting reflection surface; a second substrate disposed to confront the first substrate, the second substrate having a bonding surface parallel to the first substrate and at least one fixed mirror surface which is inclined in a sub scan direction with respect to the deflecting reflection surface so as to reduce a skew of the deflected light beam, the sub scan direction being perpendicular to the main scan direction, where the light beam first reaches the deflecting reflection surface and is reflected a plurality of times between the deflecting reflection surface and the at least one fixed mirror surface before being output as the deflected light beam. According to the optical scanning unit of the present invention, it is possible to realize the multiple reflection deflection with a high light beam deflection speed and a large deflection angle of the light beam, and with an effectively reduced skew of the deflected light beam.

A further object of the present invention is to provide an image forming apparatus comprising a photoconductive body; an optical scanning unit which outputs a light beam which is deflected in a main scan direction; and a lens system for imaging the deflected light beam from the optical deflecting unit on the photoconductive body, where the optical scanning unit comprises a torsion mirror which is pivotable about an axis and having a deflecting reflection surface which receives the light beam at an incident angle inclined with respect to a plane which is perpendicular to the axis and the deflecting reflection surface; and at least one fixed mirror surface confronting the torsion mirror and arranged so that the light beam is reflected between the torsion mirror and the at least one fixed mirror surface a plurality of times, and a moving direction of a reflection position of the light beam on the torsion mirror in a sub scan direction reverses so as to reduce a skew of the deflected light beam, the sub scan direction being perpendicular to the main scan direction. According to the image forming apparatus of the present invention, it is possible to realize the multiple reflection deflection with a high light beam deflection speed and a large deflection angle of the light beam, and with an effectively reduced skew of the deflected light beam.

Another object of the present invention is to provide an image forming apparatus comprising a photoconductive body; an optical scanning unit which outputs a light beam which is deflected in a main scan direction; and a lens system for imaging the deflected light beam from the optical deflecting unit on the photoconductive body, where the optical scanning unit comprises a first substrate pivotally supporting a torsion mirror having a deflecting reflection surface; a second substrate disposed to confront the first substrate, the second substrate having a bonding surface parallel to the first substrate and at least one fixed mirror surface which is inclined in a sub scan direction with respect to the deflecting reflection surface so as to reduce a skew of the deflected light beam, the sub scan direction being perpendicular to the main scan direction, the light beam first reaching the deflecting reflection surface and being reflected a plurality of times between the deflecting reflection surface and the at least one fixed mirror surface before being output as the deflected light beam. According to the image forming apparatus of the present invention, it is possible to realize the multiple reflection deflection with a high light beam deflection speed and a large deflection angle of the light beam, and with an effectively reduced skew of the deflected light beam.

Still another object of the present invention is to provide a method of producing an optical unit which deflects a light beam in a main scan direction, comprising the steps of (a) preparing a first substrate pivotally supporting a torsion mirror having a deflecting reflection surface; (b) disposing a second substrate on the first substrate via a spacer, the second substrate having a bonding surface parallel to the first substrate and at least one fixed mirror surface which is inclined in a sub scan direction with respect to the deflecting reflection surface so as to reduce a skew of the deflected light beam, the sub scan direction being perpendicular to the main scan direction, the light beam first reaching the deflecting reflection surface and being reflected a plurality of times between the deflecting reflection surface and the at least one fixed mirror surface before being output as the deflected light beam; and (c) bonding the first and second substrates and the spacer by matching alignment holes or marks in each of the first and second substrates and the spacer, the alignment holes or marks being smaller towards the first substrate from the second substrate via the spacer. According to the method of producing the optical unit of the present invention, it is possible to realize the multiple reflection deflection with a high light beam deflection speed and a large deflection angle of the light beam, and with an effectively reduced skew of the deflected light beam.

Other objects and further features of the present invention will be apparent from the following detailed description when read in conjunction with the accompanying drawings.

BRIEF DESCRIPTION OF THE DRAWINGS

FIGS. 1A and 1B are diagrams showing a conceivable optical scanning unit;

FIG. 2 is a perspective view showing an optical deflecting unit;

FIG. 3 is a diagram for explaining multiple reflections in a sub scan direction;

FIG. 4 is a diagram for explaining multiple reflections in a main scan direction;

FIGS. 38A through 38C are diagrams for explaining the assembling of the mirror unit shown in FIG. 34.

DESCRIPTION OF THE PREFERRED EMBODIMENTS

Figure 5A:
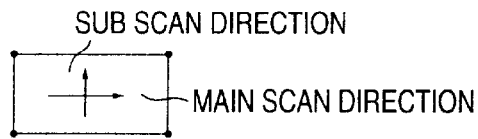
FIGS. 5A, 5B and 5C are diagrams for explaining the skew of the deflected light beam.

First, a description will be given of the skew of the deflected light beam, by referring to FIGS. 1A, 1B, 2, 3 and 4. FIGS. 1A and 1B respectively are diagrams showing a conceivable optical scanning unit viewed from a sub scan direction and a main scan direction. The paper surface in FIG. 1B corresponds to a "sub scan cross section" which is defined as a cross section which includes an axis of an optical deflecting unit and an optical axis (direction in which a light beam travels). FIG. 2 is a perspective view showing the optical deflecting unit. FIG. 3 is a diagram for explaining multiple reflections in the sub scan direction, and FIG. 4 is a diagram for explaining multiple reflections in the main scan direction.

In FIGS. 1A and 1B, a diverging laser beam emitted from a light source which is formed by a semiconductor laser 10 is converted by a coupling lens 12 into a light beam suited for an optical system which is provided at a following stage. The light beam output from the coupling lens 12 may be a "parallel light beam", "weak converged light beam" or a "weak divergent light beam". In this particular case, it is assumed for the sake that the coupling lens 12 has a collimator function, and that the incoming divergent light beam is substantially converted into the parallel light beam.

A peripheral portion of the parallel light beam is blocked as it passes through an aperture in an aperture plate 14 and the parallel light beam is shaped. The shaped (parallel) light beam is converged in only the sub scan direction by a cylindrical lens 16, and is reflected by a mirror 18 as it is converged in only the sub scan direction. The reflected light beam is then deflected by an optical deflecting unit 20.

The deflected light beam from the optical deflecting unit 20 is reflected by a mirror 22 shown in FIG. 1B, and passes through two lenses 24 and 26 which form a scanning and imaging optical system. The light beam is converged into a beam spot on a scanning surface 28 by the functions of the lenses 24 and 26. The scanning surface 28 substantially corresponds to a photoconductive surface of a photoconductive body such as a photoconductive drum.

The mirror 18 and/or the mirror 22 may be omitted depending on the layout of the optical system.

As shown in FIG. 2, the optical deflecting unit 20 includes a torsion mirror 20A, a driving unit 20B which pivots the torsion mirror, 20A at a high speed, and a fixed (or stationary) mirror 20C. A reflection surface of the torsion mirror 20A forms a deflecting reflection surface. The fixed mirror 20C is fixedly provided within a unit space of the optical deflecting unit 20.

When the light beam reflected by the mirror 18 reaches the torsion mirror 20A in an inclined manner with respect to a plane which is perpendicular to a pivotal axis of the torsion mirror 20A, the light beam reflected by the deflecting reflection surface repeats the reflection between the fixed mirror 20C and the deflecting reflection surface. In other words, the multiple reflections occur between the deflecting reflection surface of the torsion mirror 20A and the fixed mirror 20C. In the following description, the inclination angle, with respect to the above described plane, of the light beam reflected by the mirror 18 and reaching the torsion mirror 20A, will be referred to as an incident angle of the light beam with respect to the deflecting reflection surface.

The multiple reflections in the sub scan direction become as shown in FIG. 3. Since the mirror surface of the fixed mirror 20C is set parallel to the pivotal axis of the torsion mirror 20A, the incident angle and the reflection angle in the sub scan direction do not change during the multiple reflections. After the light beam is reflected a predetermined number of times by the multiple reflections, the light beam is reflected by the deflecting reflection surface of the torsion mirror 20A and output as a deflected light beam.

On the other hand, the multiple reflections in the main scan direction become as shown in FIG. 4. Because the deflecting reflection surface is inclined with respect to the fixed mirror 20C due to the pivoting of the torsion mirror 20A, the incident angle and the reflection angle in the main scan direction are gradually increased as the reflection is repeated by the multiple reflections. The light beam which is finally reflected by the deflecting reflection surface is output as a deflected light beam having a large deflection angle.

In other words, in the case of the multiple reflections in the main scan direction, the deflection angle of the reflected light beam due to the inclination of the deflecting reflection surface is amplified by the multiple reflections. Hence, even if the pivotal angle of the deflecting reflection surface of the torsion mirror 20A is small, the deflection using the multiple reflections can cause the reflected light beam to have a large deflection angle. When the pivotal angle is small, it is possible to reduce the pivoting period and to increase the pivoting frequency. For this reason, it is possible to increase the number of deflections of the light beam which is deflected, and to increase the optical scan speed of the optical deflection unit 20.

The skew of the light beam is basically a distortion or twist in the light beam, as will be described hereinafter.

In the case shown in FIGS. 1A and 1B, the light beam from the semiconductor laser 10 is converted into the parallel light beam by the coupling lens 12, and is shaped by the aperture in the aperture plate 14. The shape of the aperture is rectangular, and the size of the aperture is 1.35 mm in the main scan direction and 0.5 mm in the sub scan direction. Hence, the shaped parallel light beam has a cross sectional shape having the size of 1.35 mm in the main scan direction and 0.5 mm in the sub scan direction.

The data related to the elements of the optical scanning unit subsequent to the mirror 18 are as follows. That is, an incident angle of the light beam to the deflecting reflection surface (mirror surface of the torsion mirror 20A) is 19.4 degrees, an effective pivotal angle of the deflecting reflection surface is 3.71 degrees, a distance from the deflecting reflection surface to the fixed mirror 20C is 0.3 mm, and the number of reflections at the deflecting reflection surface is five.

The data related to the optical path from the deflecting reflection surface to the scanning surface 28 are shown in the following Table 1, where Rm denotes a paraxial radius of curvature in the main scan direction, Rs denotes a paraxial radius of curvature in the sub scan direction, N denotes a refractive index at a light wavelength of 665 nm used, and D denotes a surface interval of lens surfaces.

TABLE 1

| Surface No. | Rm | Rs | D | N |
|---|---|---|---|---|
| 1 | ∞ | ∞ | 10.2 | |
| 2 | 296.55 | −11.1 | 6.417 | 1.52677 |
| 3 | −26.86 | −35.2 | 11.74 | |
| 4 | 75.84 | −12.95 | 2.56 | 1.52677 |
| 5 | 151.23 | −5.36 | 29.3 | |

Each of the lens surfaces having the surface numbers "2", "3", "4" and "5" can be described by the following formula (1), where Z denotes a coordinate in the sub scan direction, an origin of a YZ-plane is an axis corresponding to the optical axis, and X denotes a depth in the optical axis direction.

$$X(Y,Z) = (1/Rm) \cdot Y^2 / \{1$$

$$+ \sqrt{(1-(1+}$$

$$Km) \cdot (1/Rm)^2 \cdot Y2)\} +$$

$$a4 \cdot Y^4 + a6 \cdot Y^6 + \ldots + Cs(Y) \cdot$$

$$[Z-Z0(Y)]^2 / \{1$$

$$+ \sqrt{\{1-Cs(Y)^2} \cdot$$

$$[Z-Z0(Y)]^2\}\} \qquad (1)$$

In the above formula (1), $Cs(Y)=1/Rs+b2 \cdot Y^2+b4 \cdot Y^4+b6 \cdot Y^6+ \ldots$ and $Z0(Y)=d0+d2 \cdot Y^2+d4 \cdot Y^4+d6 \cdot Y^6+ \ldots$.

Each of the surfaces of the lenses 24 and 26 having the surfaces numbers "1" through "5" can thus be specified as follows based on the above formula (1), where "E−MN" denotes "x $10^{-MN}$", and "E+MN" denotes "x $10^{+MN}$".

Surface Number "1" corresponds to the deflecting reflection surface where the fifth reflection takes place.

Surface Number "2" (incident surface of the lens 24): Km=1.85E+02, a4=−3.0E−06, a6=−2.905E−09, a8=−3.4E−11, a10=5.0E−12, b2=3.95E−04, b4=−9.533E−07, b6=1.906E−09, b8=1.57E−10, b10=−3.37E−13, b12=4.326E−15, d0=0, d2=0, d4=0, . . . .

Surface Number "3" (exit surface of the lens 24): Km=−1.93E−01, a4=2.91E−06, a6=1.375E−09, a8=−5.348E−12, a10=2.535E−14, b2=−3.253E−04, b4=2.14E−07, b6=5.939E−09, b8=2.108E−11, b10=1.117E−13, b12=1.201E−15, d0=0, d2=0, d4=0, . . . .

Surface Number "4" (incident surface of the lens 26): Km=−1.39E+01, a4=−1.102E−06, a6=−9.881E−10, a8=1.072E−12, a10=2.258E−15, a12=−1.035E−18, a14=−1.427E−23, b2=−5.281E−06, b4=1.462E−08, b6=−3.916E−11, b8=3.006E−13, b10=5.198E−16, b12=4.551E−18, d0=0, d2=0, d4=0, . . . .

Surface Number "5" (exit surface of the lens 26): Km=−6.91E+01, a4=−2.188E−06, a6=4.3228E−10, a8=2.7814E−12, a10=−1.214E−15, a12=7.686E−19, a14=4.073E−22, b2=−1.0E−04, b4=5.5E−07, b6=1.5E10, b8=2.0E−12, b12=2.0E−18, d0=0, d2=0, d4=0, . . . .

The lenses 24 and 26 are tilted counterclockwise with respect to the light beam traveling towards the center image height. In addition, the incident surface of the lens 24 is shifted by 0.3 mm in the upward direction (positive direction along the Z-axis) in FIG. 1B with respect to the light beam traveling towards the center image height, and the incident surface of the lens 26 is shifted by 1.1 mm in the upward direction (positive direction along the Z-axis) in FIG. 1B with respect to the light beam traveling towards the center image height.

Figure 5B:
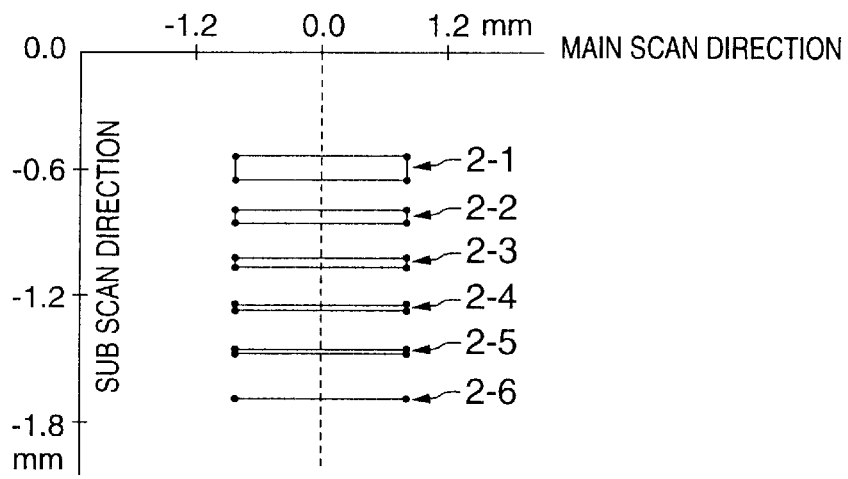
Figure 5C:
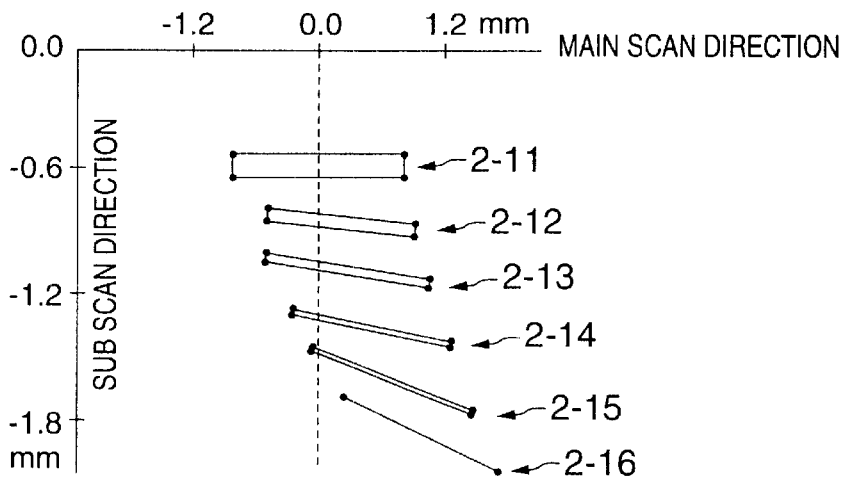

A description will be given of the skew of the deflected light beam. FIGS. 5A, 5B and 5C are diagrams for explaining the skew of the deflected light beam. FIG. 5A shows a cross sectional shape of the parallel light beam immediately after being shaped by the aperture of the aperture plate 14. The cross sectional shape of this parallel light beam is the same as the shape of the aperture in the aperture plate 14. The shaped light beam is thereafter converged in the sub scan direction by the cylindrical lens 16, reflected by the mirror 18, and reaches the deflecting reflection surface of the torsion mirror 20A of the optical deflecting unit 20 while being converged. The light beam reaching the torsion mirror 20A undergoes multiple reflections between the torsion mirror 20A and the fixed mirror 20C.

When the multiple reflections occur and the ray passing through the four corners indicated by black dots in the cross sectional shape of the parallel light beam shown in FIG. 5A are tracked, results of the ray tracking become as shown in FIGS. 5B and 5C.

FIG. 5B shows the ray tracking result for a case where the deflecting reflection surface and the fixed mirror 20C become parallel. In this state, the deflected light beam forms a beam spot on the scanning surface 28 having an image height 0.

In FIG. 5B, 2-1 denotes a cross sectional shape of the light beam on the deflecting reflection surface when the light beam reaches the deflecting reflection surface from the mirror 18, that is, the cross sectional shape of the light beam surrounded by the rays passing through the four corners shown in FIG. 5A. On the other hand, 2-2, 2-3, 2-4 and 2-5 respectively denote cross sectional shapes of the light beam at the first, second, third and fourth reflection positions on the fixed mirror 20C by the multiple reflections. In addition, 2-6 denotes a cross sectional shape of the light beam on the deflecting reflection surface when the light beam is reflected last and becomes the deflected light beam output from the optical deflecting unit 20.

As may be seen from FIG. 5B, the light beam received from the mirror 18 reaches the optical deflecting unit 20 while being converged in the sub scan direction, and thus, the width of the cross sectional shape of the light beam in the sub scan direction gradually decreases with the multiple reflections. At the position on the deflecting reflection surface where the light beam is reflected last, the light beam is imaged as a line image which is elongated in the main scan direction as indicated by 2-6 in FIG. 5B.

As may be seen from FIG. 5B, no skew is generated in the deflected light beam with respect to the beam spot on the scanning surface 28 having the image height 0.

FIG. 5C shows the ray tracking result, that is, a change in the cross sectional shape of the light beam, for a case where the deflected light beam scans the peripheral image height. In FIG. 5C, 2-11, 2-12, 2-13, 2-14, 2-15 and 2-16 respectively denote cross sectional shapes of the light beam corresponding to 2-1, 2-2, 2-3, 2-4, 2-5 and 2-6 shown in FIG. 5B.

As may be seen from FIG. 5C, the cross section of the deflected light beam towards the peripheral image height gradually rotates clockwise as the reflection is repeated by the multiple reflections in the optical deflecting unit 20. The skew is this rotation or twisting of the light beam. In the deflected light beam towards the peripheral image height, on the opposite side of the image height 0, the skew is generated in a direction (counterclockwise direction) which is opposite to that shown in FIG. 5C.

The skew is generated because the incident angle of the light beam from the mirror 18 to the torsion mirror 20A is not 0, and in a state where the image height of the beam spot is other than 0 the deflecting reflection surface of the torsion mirror 20A and the fixed mirror 20C are not parallel, thereby changing the length of the optical path of the ray passing through the four corners of the cross sectional shape of the incoming light beam to the optical deflecting unit 20.

When the length of the optical path of the ray becomes non-uniform within the same light beam, the wavefront aberration of the deflected light beam deteriorates. The deterioration of the wavefront aberration affects the spot diameter of the beam spot which is formed on the scanning surface 28. In other words, as the image height of the beam spot increases and the wavefront aberration deteriorates towards the peripheral image height, the spot diameter gradually increases from the image height 0 towards the peripheral image height, and the fattening of the beam spot occurs.

Figure 6A:
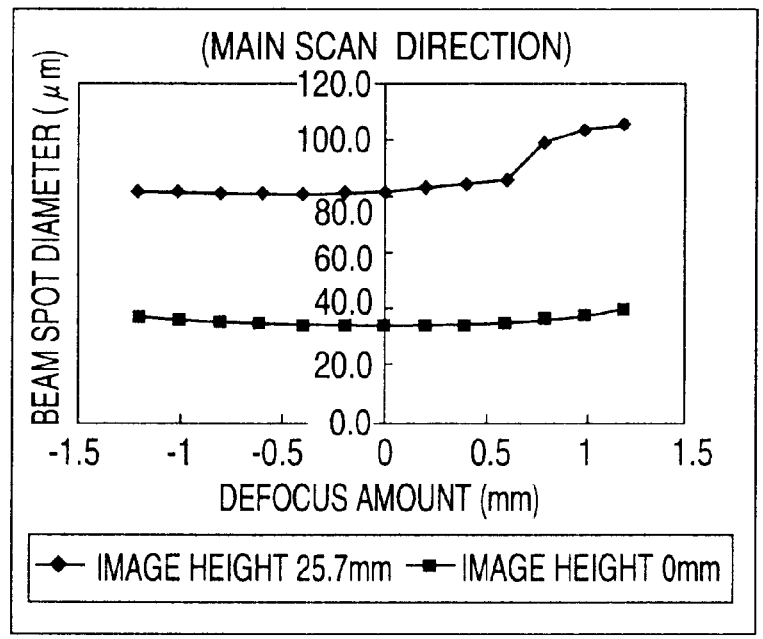
FIGS. 6A and 6B are diagrams for explaining fattening of a beam spot.
Figure 6B:
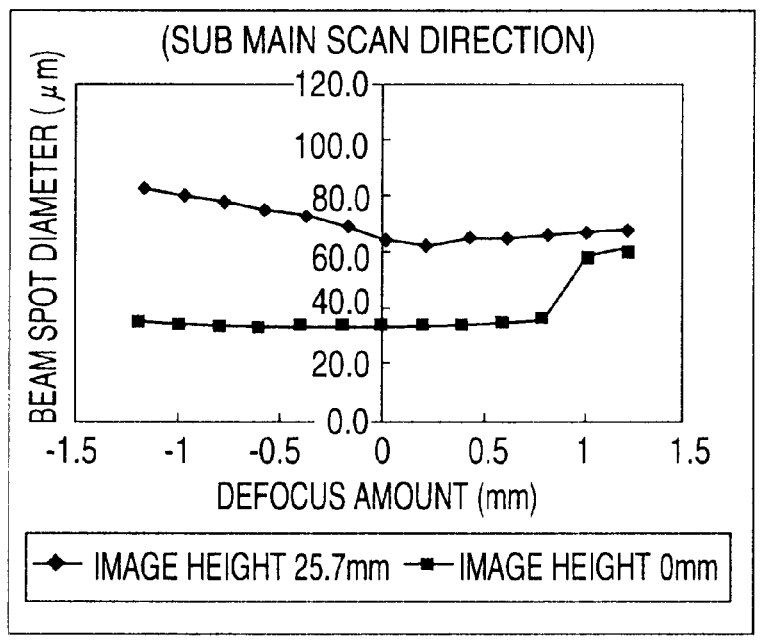

FIGS. 6A and 6B are diagrams for explaining the fattening of the beam spot. FIG. 6A shows the change of the beam spot diameter in the main scan direction on the scanning surface 28 with respect to an amount of defocus, for the center image height (image height 0) and the peripheral image height (image height 25.7 mm). On the other hand, FIG. 6B shows the change of the beam spot diameter in the sub scan direction on the scanning surface 28 with respect to an amount of defocus, for the center image height (image height 0) and the peripheral image height (image height 25.7 mm).

As may be seen from FIGS. 6A and 6B, the beam diameter of the beam spot is small and the depth margin is large for the image height 0 in both the main and sub scan directions. However, for the peripheral image height, the fattening of the beam spot occurs, and the change in the beam spot is large with respect to the defocus.

Figure 7:
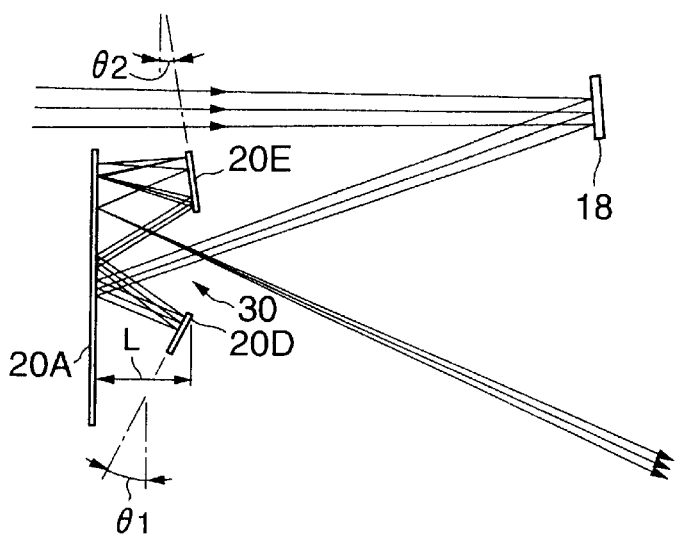
FIG. 7 is a diagram showing an important part of a first embodiment of an optical scanning unit according to the present invention.

FIG. 7 is a diagram showing an important part of a first embodiment of an optical scanning unit according to the present invention. In FIG. 7, those parts which are the same as those corresponding parts in FIGS. 1A and 1B are designated by the same reference numerals, and a description thereof will be omitted. Those parts of the optical scanning unit not shown in FIG. 7 may be the same as the corresponding parts of the conceivable optical scanning unit shown in FIGS. 1A and 1B. This first embodiment of the optical scanning unit employs a first embodiment of an optical deflecting unit according to the present invention. This first embodiment of the optical deflecting unit has a structure different from that of the conceivable optical deflecting unit shown in FIGS. 1A and 1B, and effectively reduces the skew.

As shown in FIG. 7, the optical deflecting unit has two fixed mirrors 20D and 20E with respect to the torsion mirror 20A which is driven by a driving unit similarly to the conceivable optical deflecting unit. As shown in the sub scan cross section of FIG. 7, the two fixed mirrors 20D and 20E are arranged in the sub scan direction, that is, in the vertical direction in FIG. 7, with a gap 30 formed therebetween. The incoming light beam is reflected between the deflecting reflection surface of the torsion mirror 20A and the two fixed mirrors 20D and 20E three or more times, and four times in this particular embodiment. Inclination angles $\theta_1$ and $\theta_2$ of the two fixed mirrors 20D and 20E within the sub scan cross section are mutually opposite, and a distance between the mirror surface of each of the two fixed mirrors 20D and 20E and the deflecting reflection surface of the torsion mirror 20A within the sub scan cross section gradually increases towards the gap 30. The deflected light beam is output from the optical deflecting unit via the gap 30 between the two fixed mirrors 20D and 20E.

The light beam which is first reflected by the deflecting reflection surface of the torsion mirror 20A is once reflected by the mirror surface of the fixed mirror 20D, and is then reflected by the mirror surface of the fixed mirror 20E via the deflecting reflection surface of the torsion mirror 20A. The two fixed mirrors 20D and 20E are arranged so that, while the incoming light beam is reflected three or more times between the deflecting reflection surface of the torsion mirror 20A and the mirror surfaces of the two fixed mirrors 20D and 20E, a moving direction of the reflection position on the deflecting reflection surface reverses in the sub scan direction. In addition, the deflected light beam output from the optical deflecting unit forms an angle within the sub scan cross section with respect to the incoming light beam to the deflecting reflection surface of the torsion mirror 20A received from the mirror 18.

The data related to the elements of the optical scanning unit shown in FIG. 7 subsequent to the mirror 18 are as follows. That is, an incident angle of the light beam to the deflecting reflection surface (mirror surface of the torsion mirror 20A) is 19.4 degrees, an effective pivotal angle of the deflecting reflection surface is 3.71 degrees, a distance L from the deflecting reflection surface to an upper edge of the fixed mirror 20D is 0.35 mm, and the number of reflections at the deflecting reflection surface is five. The inclination angles $\theta_1$ and $\theta_2$ of the two fixed mirrors 20D and 20E within the sub scan cross section respectively are 26.022 degrees and 9.7 degrees.

The data related to the optical path from the deflecting reflection surface to the scanning surface 28 (not shown in FIG. 7) are shown in the following Table 2, where Rm denotes a paraxial radius of curvature in the main scan direction, Rs denotes a paraxial radius of curvature in the sub scan direction, N denotes a refractive index at a light wavelength of 665 nm used, and D denotes a surface interval of lens surfaces.

TABLE 2

| Surface No. | Rm | Rs | D | N |
|---|---|---|---|---|
| 1 | ∞ | ∞ | 12.6 | |
| 2 | 296.55 | −11.1 | 6.417 | 1.52677 |
| 3 | −26.86 | −35.2 | 11.74 | |
| 4 | 75.84 | −12.95 | 2.56 | 1.52677 |
| 5 | 151.23 | −5.12 | 29.3 | |

Each of the lens surfaces having the surface numbers "2", "3", "4" and "5" can be described by the formula (1) described above. The lens surfaces having the surface numbers "2" and "5" have a generatrix which connects vertexes of the lens surface and is curved in the sub scan direction.

Each of the surfaces of the lenses 24 and 26 (not shown in FIG. 7) having the surfaces numbers "1" through "5" can thus be specified as follows based on the above formula (1), where "E−MN" denotes "x $10^{-MN}$", and "E+MN" denotes "x $10^{+MN}$".

Surface Number "1" corresponds to the deflecting reflection surface where the fifth reflection takes place.

Surface Number "2" (incident surface of the lens 24): Km=1.85E+02, a4=2.080E−06, a6=−2.905E−09, a8=−1.15E−11, a10=2.196E−14, b2=3.95E−04, b4=−9.533E−07, b6=1.906E−09, b8=1.57E−10, b10=−3.37E−13, b12=4.326E−15, d2=2.0E−04, d4=3.08E−06, d6=2.3E−08, . . . .

Surface Number "3" (exit surface of the lens 24): Km=−1.93E−01, a4=2.91E−06, a6=1.375E−09, a8=−5.348E−12, a10=2.535E−14, b2=−3.253E−04, b4=2.14E−07, b6=5.939E−09, b8=2.108E−11, b10=1.117E−13, b12=1.201E−15, d0=0, d2=0, d4=0, . . . .

Surface Number "4" (incident surface of the lens 26): Km=−1.39E+01, a4=−1.102E−06, a6=−9.881E−10, a8=1.072E−12, a10=2.258E−15, a12=−1.035E−18, a14=−1.427E−23, b2=−5.281E−06, b4=1.462E−08, b6=−3.916E−11, b8=3.006E−13, b10=5.198E−16, b12=4.551E−18, d0=0, d2=0, d4=0, . . . .

Surface Number "5" (exit surface of the lens 26): Km=−6.91E+01, a4=−2.188E−06, a6=4.3228E−10, a8=2.7814E−12, a10=−1.214E−15, a12=7.686E−19, a14=4.073E−22, b2=8.18E−05, b4=−1.48E−07, b6=1.26E−10, b8=7.0E−14, b12=4.5E−18, d2=−4.0E−05, d4=−5.0E−09, d6=4.38E−11, . . . .

The lenses 24 and 26 are tilted counterclockwise with respect to the light beam traveling towards the center image height. In addition, the incident surface of the lens 24 is shifted by 0.3 mm in the upward direction (positive direction along the Z-axis) in FIG. 1B with respect to the light beam traveling towards the center image height, and the incident surface of the lens 26 is shifted by 1.1 mm in the upward direction (positive direction along the Z-axis) in FIG. 1B with respect to the light beam traveling towards the center image height.

Figure 8A:
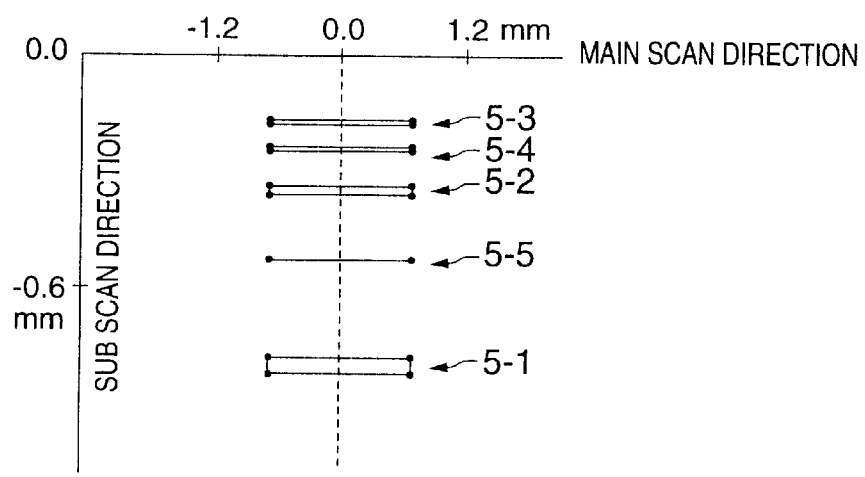
FIGS. 8A and 8B are diagrams for explaining correction of the skew of the deflected light beam in the first embodiment.
Figure 8B:
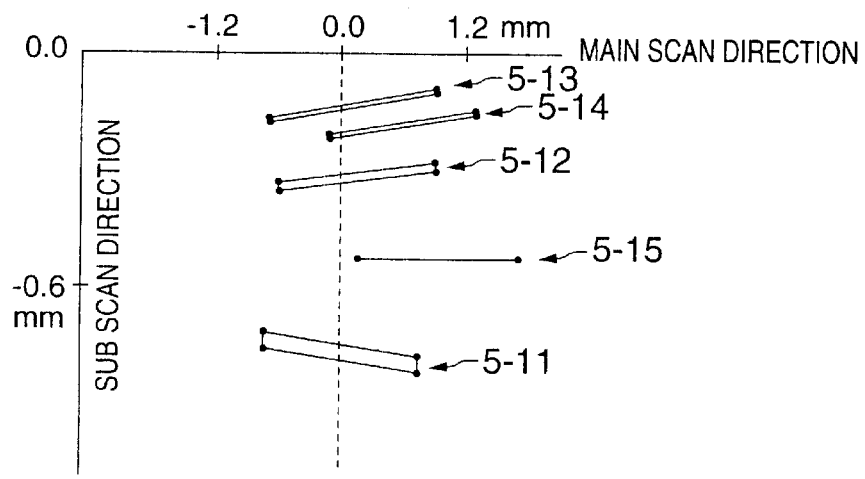

When the multiple reflections occur between the deflecting reflection surface of the torsion mirror 20A and the two fixed mirrors 20D and 20E and the and the ray passing through the four corners indicated by black dots in the cross sectional shape of the parallel light beam shown in FIG. 5A are tracked, results of the ray tracking become as shown in FIGS. 8A and 8B in this first embodiment. FIGS. 8A and 8B are diagrams for explaining correction of the skew of the deflected light beam in this first embodiment.

FIG. 8A shows the ray tracking result for a case where the deflecting reflection surface and the fixed mirrors 20D and 20E become parallel. In this state, the deflected light beam forms a beam spot on the scanning surface 28 having an image height 0.

In FIG. 8A, 5-1 denotes a cross sectional shape of the light beam on the mirror surface of the fixed mirror 20D when the light beam from the mirror is reflected by the deflecting reflection surface and reaches the fixed mirror 20D. On the other hand, 5-2, 5-3 and 5-4 respectively denote cross sectional shapes of the light beam at the second, third and fourth reflection positions on the fixed mirror 20E by the multiple reflections. In addition, 5-5 denotes a cross sectional shape of the light beam on the deflecting reflection surface when the light beam is reflected last and becomes the deflected light beam output from the optical deflecting unit.

Due to the arrangement of the two fixed mirrors 20D and 20E, the reflection position on the mirror surface of the fixed mirror 20E moves upwardly in the sub scan direction for the first through third reflections, but thereafter reverses direction and moves downwardly in the sub can direction after the third reflection.

As may be seen from FIG. 8A, no skew is generated in the deflected light beam in this first embodiment with respect to the beam spot on the scanning surface 28 having the image height 0.

FIG. 8B shows the ray tracking result, that is, a change in the cross sectional shape of the light beam, for a case where the deflected light beam scans the peripheral image height. In FIG. 8B, 5-11, 5-12, 5-13, 5-14 and 5-15 respectively denote cross sectional shapes of the light beam corresponding to 5-1, 5-2, 5-3, 5-4 and 5-5 shown in FIG. 8A.

As may be seen from FIG. 8B, no skew is generated in the deflected light beam in this first embodiment with respect to the beam spot on the scanning surface 28 having the image height 0, and also with respect to the beam spot on the scanning surface 28 having the peripheral image height. In other words, the skew is effectively corrected.

In the conceivable optical scanning unit shown in FIGS. 1A and 1B, the mirror surface of the fixed mirror 20C is parallel to the deflecting reflection surface of the torsion mirror 20A in the sub scan direction. For this reason, the reflection position of the light beam scanning the peripheral image height shifts in only one direction on both the deflecting reflection surface of the torsion mirror 20A and the mirror surface of the fixed mirror 20C. Consequently, the skew increases towards the peripheral image height.

On the other hand, according to this first embodiment, the reflection position on the mirror surface of the fixed mirror 20E moves in two directions in the sub scan direction, that is, the reflection position on the deflecting reflection surface of the torsion mirror 20A moves in two directions in the sub scan directions, to thereby reduce or correct the skew.

Figure 9A:
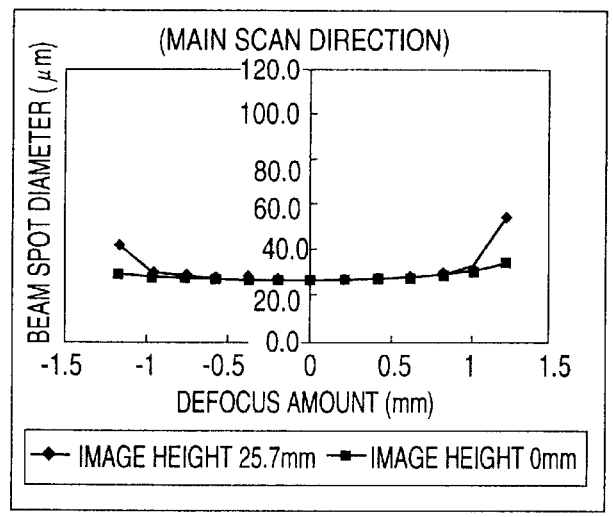
FIGS. 9A and 9B are diagrams for explaining the beam spot obtained in the first embodiment.
Figure 9B:
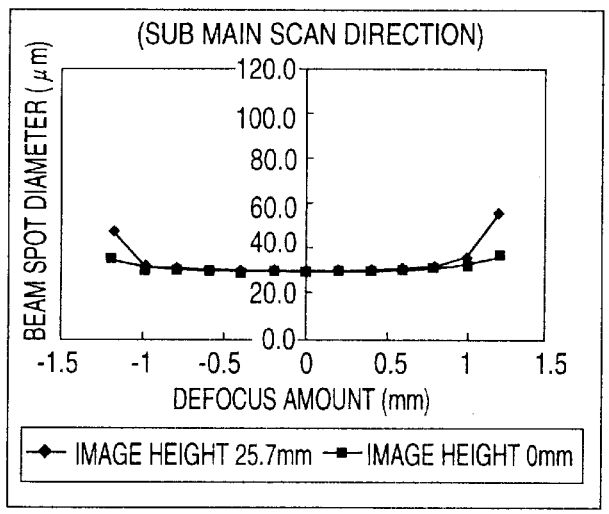

FIGS. 9A and 9B are diagrams for explaining the beam spot obtained in this first embodiment. FIG. 9A shows the change of the beam spot diameter in the main scan direction on the scanning surface 28 with respect to an amount of defocus, for the center image height (image height 0) and the peripheral image height (image height 25.7 mm), similarly to FIG. 6A described above. On the other hand, FIG. 9B shows the change of the beam spot diameter in the sub scan direction on the scanning surface 28 with respect to an amount of defocus, for the center image height (image height 0) and the peripheral image height (image height 25.7 mm), similarly to FIG. 6B described above.

As may be seen from FIGS. 9A and 9B, the beam diameter of the beam spot is small and the depth margin is large for the center image height (image height 0) and the peripheral image height (image height 25.7 mm) in both the main and sub scan directions. Unlike the conceivable optical scanning unit described above, no fattening of the beam spot occurs, and the effects the skew is considerably reduced compared to the conceivable optical scanning unit.

In the conceivable optical scanning unit described above, the light beam tilts due to the skew within the passing range of the light beam on the fixed mirror 20C, as shown in FIGS. 5A through 5C. For this reason, it is difficult to process the edge portion of the fixed mirror 20C so that the deflected light beam last reflected by the deflecting reflection surface is not kicked by the fixed mirror 20C.

But in this first embodiment, the incident angle of the light beam with respect to the deflecting reflection surface changes for every reflection, and in addition, the positive or negative sign of the incident angle may change. Therefore, in this first embodiment, the final tilt of the light beam due to the skew is small, and furthermore, it is easy to process the edge portion of the gap (or slit) 30 between the fixed mirrors 20D and 20E. Moreover, because the tilt of the light beam due to the skew is reduced, it is easy to separate the light beam that is reflected and the light beam that is output by passing through the gap (slit) 30.

Figure 10:
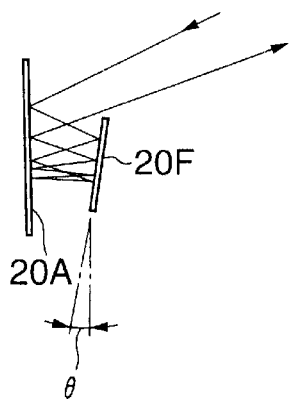
FIG. 10 is a diagram showing an important part of a second embodiment of the optical scanning unit according to the present invention.

Next, a description will be given of a second embodiment of the optical scanning unit according to the present invention. FIG. 10 is a diagram showing an important part of this second embodiment of the optical scanning unit. In FIG. 10, those parts which are the same as those corresponding parts in FIGS. 1A and 1B are designated by the same reference numerals, and a description thereof will be omitted. Those parts of the optical scanning unit not shown in FIG. 10 may be the same as the corresponding parts of the conceivable optical scanning unit shown in FIGS. 1A and 1B. This second embodiment of the optical scanning unit employs a second embodiment of the optical deflecting unit according to the present invention. This second embodiment of the optical deflecting unit has a structure different from that of the conceivable optical deflecting unit shown in FIGS. 1A and 1B, and effectively reduces the skew.

As shown in FIG. 10, the optical deflecting unit has a single fixed mirror 20F with respect to the torsion mirror 20A which is driven by a driving unit similarly to the conceivable optical deflecting unit. As shown in the sub scan cross section of FIG. 10, the fixed mirror 20F is arranged in the sub scan direction at an angle with respect to the torsion mirror 20A, so that the incoming light beam is reflected between the deflecting reflection surface of the torsion mirror 20A and the two fixed mirrors 20D and 20E three or more times, and four times in this particular embodiment. The fixed mirror 20F has an inclination angle θ within the sub scan cross section, and a distance between the mirror surface of the fixed mirror 20F and the deflecting reflection surface of the torsion mirror 20A within the sub scan cross section gradually increases upwardly in FIG. 10. The deflected light beam is output from the optical deflecting unit via a top gap between the fixed mirror 20F and the torsion mirror 20A.

While the light beam from the mirror 18 is reflected three or more times between the deflecting reflection surface of the torsion mirror 20A and the mirror surface of the fixed mirror 20F, a moving direction of the reflection position on the deflecting reflection surface reverses in the sub scan direction. In addition, the deflected light beam output from the optical deflecting unit forms an angle within the sub scan cross section with respect to the incoming light beam to the deflecting reflection surface of the torsion mirror 20A received from the mirror 18.

The data related to the elements of the optical scanning unit shown in FIG. 10 subsequent to the mirror 18 (not shown in FIG. 10) are as follows. That is, an incident angle of the light beam to the deflecting reflection surface (mirror surface of the torsion mirror 20A) is 19.4 degrees, an effective pivotal angle of the deflecting reflection surface is 3.71 degrees, a distance L from the deflecting reflection surface to an upper edge of the fixed mirror 20F is 0.35 mm, and the number of reflections at the deflecting reflection surface is five. The inclination angle θ of the fixed mirror 20F within the sub scan cross section is 5.55 degrees.

The data related to the optical path from the deflecting reflection surface to the scanning surface 28 (not shown in FIG. 10) are shown in the following Table 3, where Rm denotes a paraxial radius of curvature in the main scan direction, Rs denotes a paraxial radius of curvature in the sub scan direction, N denotes a refractive index at a light wavelength of 665 nm used, and D denotes a surface interval of lens surfaces.

TABLE 3

| Surface No. | Rm | Rs | D | N |
| --- | --- | --- | --- | --- |
| 1 | ∞ | ∞ | 10.4 | |
| 2 | 296.55 | −11.1 | 6.417 | 1.52677 |
| 3 | −26.86 | −35.2 | 11.74 | |
| 4 | 75.84 | −12.95 | 2.56 | 1.52677 |
| 5 | 151.23 | −5.12 | 29.3 | |

Each of the lens surfaces having the surface numbers "2", "3", "4" and "5" can be described by the formula (1) described above. The lens-surfaces having the surface numbers "2" and "5" have a generatrix which connects vertexes of the lens surface and is curved in the sub scan direction.

Each of the surfaces of the lenses 24 and 26 (not shown in FIG. 10) having the surfaces numbers "1" through "5" can thus be specified as follows based on the above formula (1), where "E−MN" denotes "x $10^{-MN}$", and "E+MN" denotes "x $10^{+MN}$".

Surface Number "1" corresponds to the deflecting reflection surface where the fifth reflection takes place.

Surface Number "2" (incident surface of the lens 24): Km=1.85E+02, a4=2.080E−06, a6=−2.905E−09, a8=−1.15E−11, a10=2.196E−14, b2=3.95E−04, b4=−9.533E−07, b6=1.906E−09, b8=1.57E−10, b10=−3.37E−13, b12=4.326E−15, d2=2.0E−04, d4=3.08E−06, d6=2.3E−08, . . . .

Surface Number "3" (exit surface of the lens 24): Km=−1.93E−01, a4=2.91E−06, a6=1.375E−09, a8=−5.348E−12, a10=2.535E−14, b2=−3.253E−04, b4=2.14E−07, b6=5.939E−09, b8=2.108E−11, b10=1.117E−13, b12=1.201E−15, d0=0, d2=0, d4=0, . . . .

Surface Number "4" (incident surface of the lens 26): Km=−1.39E+01, a4=−1.102E−06, a6=−9.881E−10, a8=1.072E−12, a10=2.258E−15, a12=−1.035E−18, a14=−1.427E−23, b2=−5.281E−06, b4=1.462E−08, b6=−3.916E−11, b8=3.006E−13, b10=5.198E−16, b12=4.551E−18, d0=0, d2=0, d4=0, . . . .

Surface Number "5" (exit surface of the lens 26): Km=−6.91E+01, a4=−2.188E−06, a6=4.3228E−10, a8=2.7814E−12, a10=−1.214E−15, a12=7.686E−19, a14=4.073E−22, b2=8.18E−05, b4=−1.48E−07, b6=1.26E−10, b8=7.0E−14, b12=4.5E−18, d2=−4.0E−05, d4=−5.0E−09, d6=4.38E−11, . . . .

The lenses 24 and 26 are tilted counterclockwise with respect to the light beam traveling towards the center image height. In addition, the incident surface of the lens 24 is shifted by 0.3 mm in the upward direction (positive direction along the Z-axis) in FIG. 1B with respect to the light beam traveling towards the center image height, and the incident surface of the lens 26 is shifted by 1.1 mm in the upward direction (positive direction along the Z-axis) in FIG. 1B with respect to the light beam traveling towards the center image height. Accordingly, the arrangement of the lenses 24 and 26 in this second embodiment is basically the same as that of the first embodiment, except for the distance between the deflecting reflection surface of the torsion mirror 20A and the incident surface of the lens 24.

According to this second embodiment, the reflection position on the mirror surface of the fixed mirror 20F moves in two directions in the sub scan direction, that is, the reflection position on the deflecting reflection surface of the torsion mirror 20A moves in two directions in the sub scan directions, to thereby reduce or correct the skew.

Figure 11A:
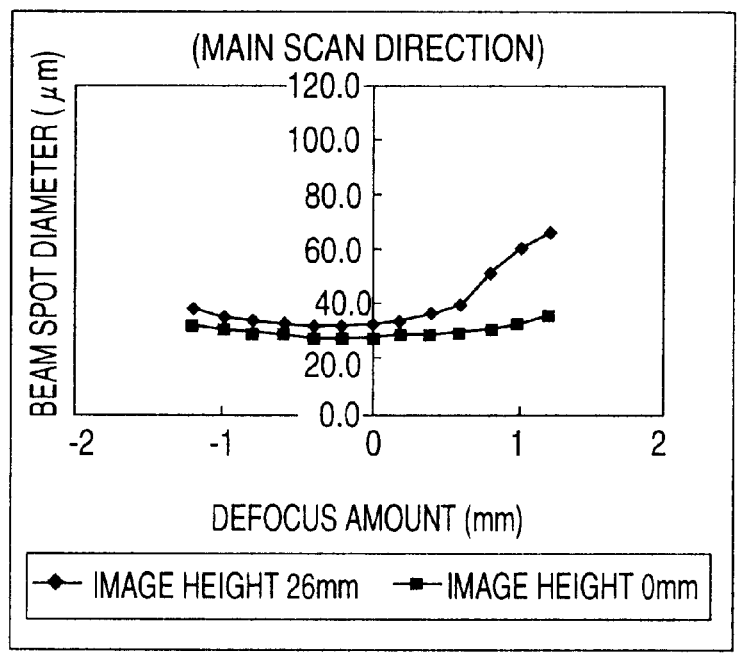
FIGS. 11A and 11B are diagrams for explaining the beam spot obtained in the second embodiment.
Figure 11B:
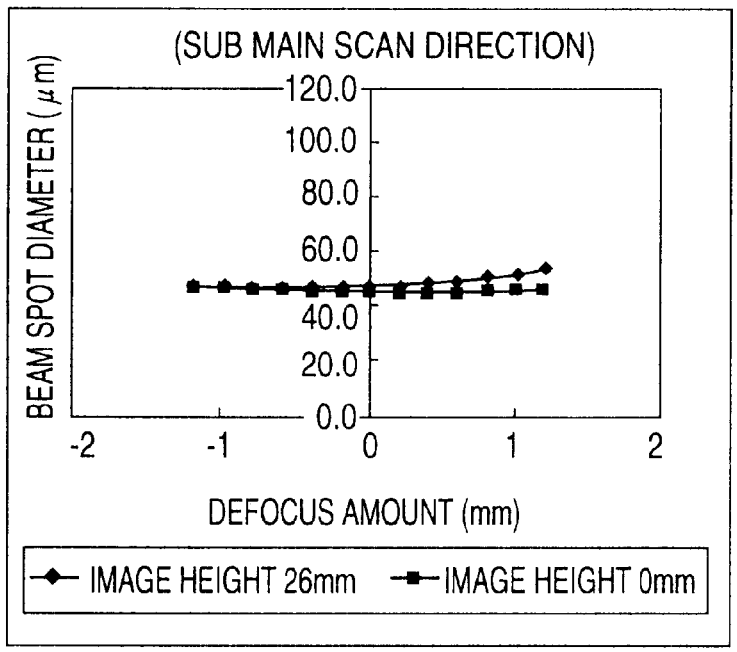

FIGS. 11A and 11B are diagrams for explaining the beam spot obtained in this second embodiment. FIG. 11A shows the change of the beam spot diameter in the main scan direction on the scanning surface 28 with respect to an amount of defocus, for the center image height (image height 0) and the peripheral image height (image height 25.7 mm), similarly to FIG. 9A described above. On the other hand, FIG. 11B shows the change of the beam spot diameter in the sub scan direction on the scanning surface 28 with respect to an amount of defocus, for the center image height (image height 0) and the peripheral image height (image height 25.7 mm), similarly to FIG. 9B described above.

As may be seen from FIGS. 11A and 11B, the beam diameter of the beam spot is small and the depth margin is large for the center image height (image height 0) and peripheral image height (image height 25.7 mm) in both the main and sub scan directions. Unlike the conceivable optical scanning unit described above, no fattening of the beam spot occurs, and the effects the skew is considerably reduced compared to the conceivable optical scanning unit.

In the conceivable optical scanning unit described above, the light beam tilts due to the skew within the passing range of the light beam on the fixed mirror 20C, as shown in FIGS. 5A through 5C. For this reason, it is difficult to process the edge portion of the fixed mirror 20C so that the deflected light beam last reflected by the deflecting reflection surface is not kicked by the fixed mirror 20C.

But in this second embodiment, the incident angle of the light beam with respect to the deflecting reflection surface changes for every reflection, and in addition, the positive or negative sign of the incident angle may change. Therefore, in this second embodiment, the final tilt of the light beam due to the skew is small, and furthermore, it is easy to process the upper edge portion of the fixed mirror 20F. Moreover, because the tilt of the light beam due to the skew is reduced, it is easy to separate the light beam that is reflected and the light beam that is output.

Figure 12:
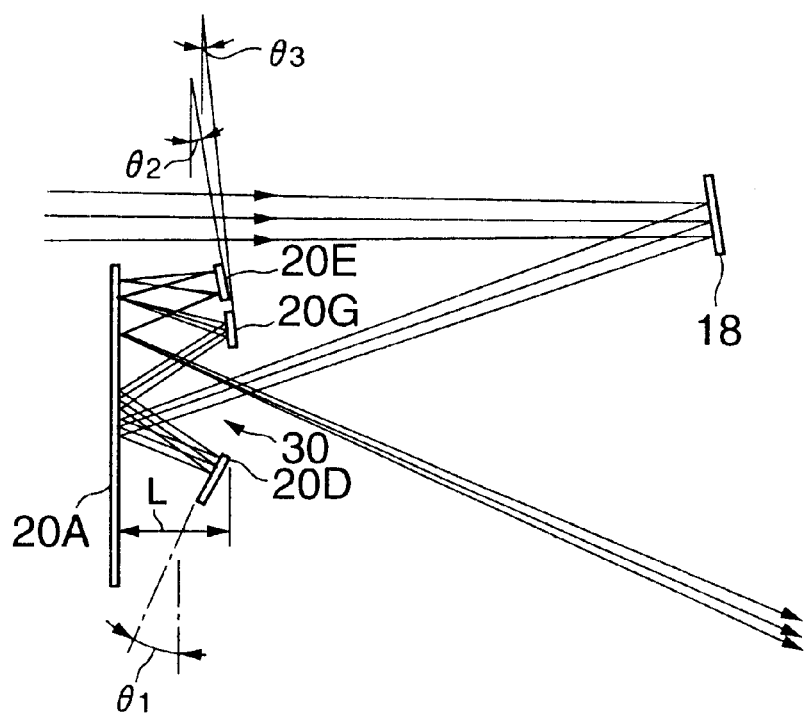
FIG. 12 is a diagram showing an important part of a third embodiment of the optical scanning unit according to the present invention.

Next, a description will be given of a third embodiment of the optical scanning unit according to the present invention. FIG. 12 is a diagram showing an important part of this third embodiment of the optical scanning unit. In FIG. 12, those parts which are the same as those corresponding parts in FIG. 7 are designated by the same reference numerals, and a description thereof will be omitted. Those parts of the optical scanning unit not shown in FIG. 12 may be the same as the corresponding parts of the conceivable optical scanning unit shown in FIGS. 1A and 1B. This third embodiment of the optical scanning unit employs a third embodiment of the optical deflecting unit according to the present invention. This third embodiment of the optical deflecting unit has a structure different from that of the conceivable optical deflecting unit shown in FIGS. 1A and 1B, and effectively reduces the skew.

As shown in FIG. 12, the optical deflecting unit has three fixed mirrors 20D, 20E and 20G with respect to the torsion mirror 20A which is driven by a driving unit similarly to the conceivable optical deflecting unit. As shown in the sub scan cross section of FIG. 12, the three fixed mirrors 20D, 20E and 20G are arranged in the sub scan direction, that is, in the vertical direction in FIG. 12, with a gap 30 formed between the fixed mirror 20D and the fixed mirror 20G. The incoming light beam is reflected between the deflecting reflection surface of the torsion mirror 20A and the three fixed mirrors 20D, 20E and 20G three or more times, and four times in this particular embodiment. An inclination angle $\theta_1$ of the fixed mirror 20D and inclination angles $\theta_2$ and $\theta_3$ of the fixed mirrors 20E and 20G within the sub scan cross section are mutually opposite, and a distance between the mirror surface of each of the three fixed mirrors 20D, 20E and 20G and the deflecting reflection surface of the torsion mirror 20A within the sub scan cross section gradually increases towards the gap 30. The deflected light beam is output from the optical deflecting unit via the gap 30 between the two fixed mirrors 20D and 20E.

The light beam which is first reflected by the deflecting reflection surface of the torsion mirror 20A is once reflected by the mirror surface of the fixed mirror 20D, and is then reflected by the mirror surface of the fixed mirror 20G via the deflecting reflection surface of the torsion mirror 20A, and is thereafter reflected by the mirror surface of the fixed mirror 20G via the deflecting reflection surface of the torsion mirror 20A. The three fixed mirrors 20D, 20E and 20G are arranged so that, while the incoming light beam is reflected three or more times between the deflecting reflection surface of the torsion mirror 20A and the mirror surfaces of the three fixed mirrors 20D, 20E and 20G, a moving direction of the reflection position on the deflecting reflection surface reverses in the sub scan direction. In addition, the deflected light beam output from the optical deflecting unit forms an angle within the sub scan cross section with respect to the incoming light beam to the deflecting reflection surface of the torsion mirror 20A received from the mirror 18.

But in this third embodiment, the incident angle of the light beam with respect to the deflecting reflection surface changes for every reflection, and in addition, the positive or negative sign of the incident angle may change. Therefore, in this third embodiment, the final tilt of the light beam due to the skew is small, and furthermore, it is easy to process the edge portion of the gap 30 between the fixed mirrors 20D and 20G. Moreover, because the tilt of the light beam due to the skew, is reduced, it is easy to separate the light beam that is reflected and the light beam that is output by passing through the gap 30.

In the first through third embodiments described above, the torsion mirror 20A has only one deflecting reflection surface, but it is of course possible to use a multi-faced mirror, such as a polygonal mirror, as the torsion mirror 20A. The torsion mirror 20A of the first through third embodiments is formed by a micro mirror having a mirror surface with a small width of 4 mm in the main scan direction and a small effective pivotal angle of 3.71 degrees. For this reason, even if the deflection angle is set large, the effective scan width is only 50.5 mm and relatively small. But by arranging a plurality of optical systems of any of the first through third embodiments in the main scan direction, it is possible to considerably increase the effective scan width.

Figure 13:
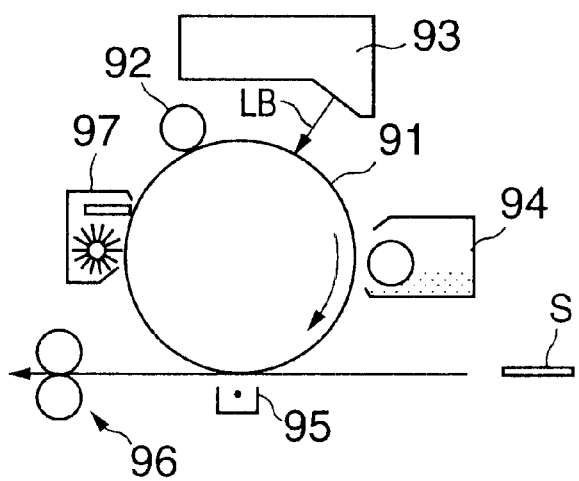
FIG. 13 is a diagram showing an important part of a first embodiment of an image forming apparatus according to the present invention.

FIG. 13 is a diagram showing an important part of a first embodiment of an image forming apparatus according to the present invention. In this first embodiment of the image forming apparatus, the present invention is applied to a laser printer.

The laser printer shown in FIG. 13 includes a photoconductive body 91 having a drum shape and rotatable in a clockwise direction of an arrow. A charging unit 92, a developing unit 94, and a transfer unit 95, and a cleaning unit 97 are arranged around the periphery of the photoconductive body 91. The charging unit 92 may be formed by a contact type charger using a roller as shown in FIG. 13 or, a non-contact type charger such as a Corona charger. The transfer unit 95 may be formed by a contact type transfer unit using a transfer roller or, a non-contact type transfer unit using Corona discharge as shown in FIG. 13.

An optical scanning unit 93 scans the photoconductive body 91, between the charging unit 92 and the developing unit 94, by a laser beam LB. Images are optically written on the surface of the photoconductive body 91 by a known optical write process. In this embodiment, a recording medium S has a form of a sheet such as paper. A fixing unit 96 is provided on a downstream side of the transfer unit 95 along a transport direction (right to left in FIG. 13) of the recording medium S.

When forming an image on the recording medium S, the photoconductive body 91 is rotated clockwise at a constant speed, and the surface of the photoconductive body 91 is uniformly charged by the charging unit 92. The laser beam LB emitted from the optical scanning unit 93 optically writes exposes an image on the charged surface of the photoconductive body 91, to thereby form an electrostatic latent image. The electrostatic latent image on the surface of the photoconductive body 91 is developed by the developing unit 94, to thereby form a toner image on the surface of the photoconductive body 91. The recording medium S is transported to a transfer position at a timing synchronized to the transfer of the toner image. The transfer unit 94 electrostatically transfers the toner image on the surface of the photoconductive body 91 onto the recording medium S.

The recording medium S having the toner image transferred thereon is transported to a fixing position where the fixing unit 96 fixes the toner image on the recording medium S. The recording medium S is thereafter ejected outside the image forming apparatus. After the toner image is transferred onto the recording medium S, the surface of the photoconductive body 91 is cleaned by the cleaning unit 97 so as to remove the residual toner, powder of the recording medium S such as paper powder, and the like. It is of course possible to use an over-head-projector (OHP) sheet as the recording medium S. In addition, the transfer of the toner image from the photoconductive body 91 to the recording medium S may be made via an intermediate transfer medium such as an intermediate transfer belt.

The optical scanning unit 93 may be formed by any of the first through third embodiments of the optical scanning unit described above. In other words, the optical scanning unit 93 may use any of the first through third embodiments of the optical deflecting unit which includes a deflector having a deflecting reflection surface which is rotated, pivoted or vibrated about an axis and deflects a light beam incident thereto at an angle which is inclined with respect to a surface perpendicular to the axis, and one or more fixed mirrors which confront the deflecting reflection surface and reflects the light beam a plurality of times between the deflecting reflection surface and the one or more fixed mirrors, where the inclination angle of the one or more mirrors with respect to the axis within a sub scan cross section is set to effectively reduce the skew of the deflected light beam which optically scans the scanning surface, that is, the surface of the photoconductive body 91. Furthermore, a plurality of optical scanning units 93 may be arranged in a direction perpendicular to the paper in FIG. 13, for example.

FIGS. 14A through 14E are cross sectional views for explaining a first embodiment of a method of producing an optical unit according to the present invention. It is assumed for the sake of convenience that this first embodiment of the method produces a confronting mirror member 110 to be used in a mirror unit 101 shown in FIG. 18 which will be described later. More particularly, this first embodiment of the method produces a confronting mirror member (fixed mirror) which confronts the torsion mirror of the optical deflecting unit.

Figure 14A:
FIGS. 14A through 14E are cross sectional views for explaining a first embodiment of a method of producing an optical unit according to the present invention.
Figure 14B:
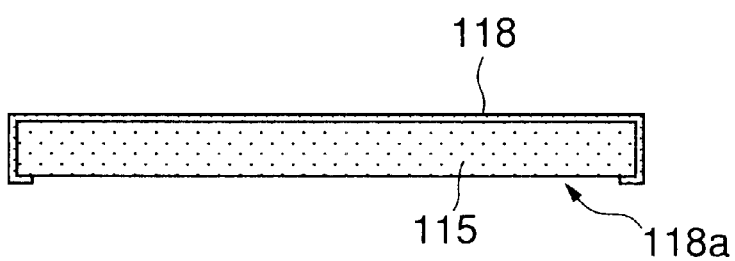
Figure 14C:
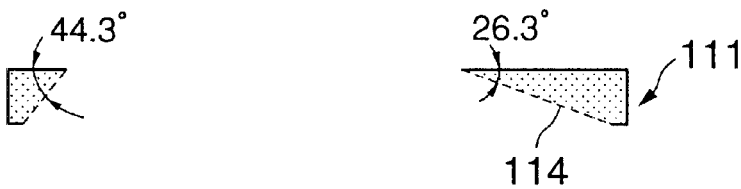
Figure 14D:
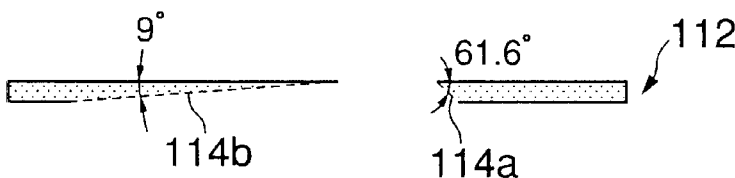

A Si substrate 115 shown in FIG. 14A having a surface with a crystal orientation [110] is prepared, and a SiN layer 118 is formed on both sides of the Si substrate 115 by a LPCVD as shown in FIG. 14B. A desired pattern 118*a* is formed in the SiN layer 118 by employing a photolithography technique and dry etching of the SiN layer 118. Thereafter, an anisotropic etching is carried out in a KOH solution having a density of 25 wt % at a temperature of 80° C., so as to form substrate members 111 and 112 of a confronting mirror member 110 by inclining the corresponding Si substrates 115 by slice angles of 26.3 degrees and 9 degrees with respect to the crystal orientation [110], as respectively shown in FIGS. 14C and 14D.

Figure 14E:
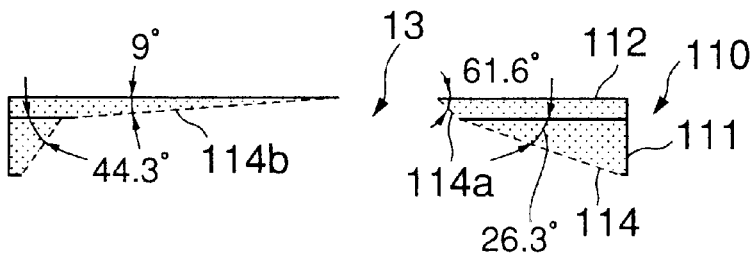

When forming the substrate members 111 and 112 of the confronting mirror member 110, a tapered surface having an angle of 35.3 degrees with respect to the surface of the Si substrate 115 is normally formed by subjecting the Si substrate 115 having a zero slice angle and the crystal orientation [110] to the anisotropic etching. This is because a crystal orientation [111] appears, which has an extremely slow etching rate in a direction forming an angle of 35.3 degrees with respect to the surface of the Si substrate 115. Accordingly, tapered surfaces having angles of 9 degrees and 26.3 degrees are formed on the respective Si substrates 115 which are inclined by the slice angles of 26.3 degrees and 9 degrees with respect to the crystal orientation [110]. When each SiN layer 118 is thereafter removed by etching, the confronting mirror member 110 shown in FIG. 14E is formed. Finally, the substrate members 111 and 112 are directly bonded, for example, so that the confronting mirror member 110 has a structure wherein tapered surfaces 114 and 114*b* respectively form the angles of 9 degrees and 26.3 degrees with respect to the corresponding substrate members 111 and 112.

It is possible to suppress curving of the light beam in the sub scan direction and to improve the image quality as the scan angle in the main scan direction increases by the multiple reflections, because the reflecting surfaces of the confronting mirror member 110 are inclined in the sub scan direction. Furthermore, the two reflecting (mirror) surfaces of the confronting mirror member 110 can independently be set to arbitrary angles when formed from the two substrate members 111 and 112, and the degree of freedom of design is increased because the relative positions of the two reflecting (mirror) surfaces can be set freely.

This first embodiment of the method uses two Si substrate which are respectively inclined by the slice angles of 26.3 degrees and 9 degrees from the crystal orientation [110]. However, the tapered surfaces having the angles of 9 degrees and 26.3 degrees can similarly be formed using two Si substrates which are respectively inclined by slice angles of 45.7 degrees and 28.4 degrees from the crystal orientation [100]. This is because, normally, when a Si substrate having a surface with the crystal orientation [100] and a zero slice angle is subjected to an anisotropic etching, a tapered surface having an angle of 54.7 degrees with respect to the surface of the Si substrate is formed. When the reflecting (mirror) surface is formed by the surface having a strong etching resistance with respect to the anisotropic etching and the crystal orientation [111] which is stable, it is possible to obtain a smooth reflecting (mirror) surface having an accurate inclination angle with respect to the Si substrate surface.

As long as it is possible to expose the tapered surface having the crystal orientation [111], the slice angle and the crystal orientation which is used as a reference are not limited to the above. In addition, it may be seen that an arbitrary tapered angle is obtainable by appropriately adjusting the slice angle. Furthermore, even in a case where an arbitrary slice angle is not obtained, it is possible to form a seed crystal and obtain a Si ingot so that the crystal orientation [111] appears at a desired tapered angle. Moreover, the tapered surface of the substrate may be formed by polishing the substrate surface, without having to use a Si substrate which is inclined by a slice angle with respect to the crystal orientation. Compared to the crystal orientations [110] and [100], the crystal orientation [111] of the tapered surface have an extremely slow etching rate, thereby making it possible to obtain a smooth etching surface which has an accurate tapered angle and is suited for use as a reflecting (mirror) surface.

FIGS. 15A through 15G are cross sectional views for explaining a second embodiment of the method of producing the optical unit according to the present invention. It is assumed for the sake of convenience that this second embodiment of the method produces the confronting mirror member 110 to be used in the mirror unit 101 shown in FIG. 18 which will be described later. More particularly, this second embodiment of the method produces the confronting mirror member (fixed mirror) which confronts the torsion mirror of the optical deflecting unit. In FIGS. 15A through 15G, those parts which are the same as those corresponding parts in FIGS. 14A through 14E are designated by the same reference numerals, and a description thereof will be omitted.

Figure 15A:
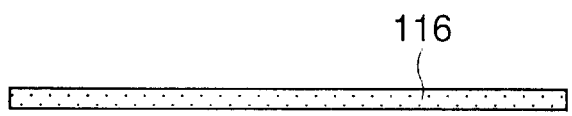
FIGS. 15A through 15G are cross sectional views for explaining a second embodiment of the method of producing the optical unit according to the present invention.
Figure 15B:
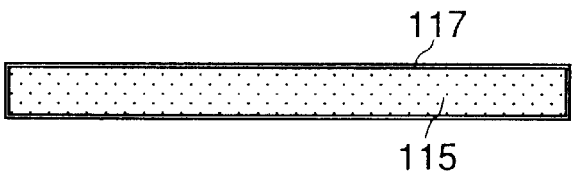

First, Si substrates 115 and 116 which are respectively inclined by slice angles of 26.3 degrees and 9 degrees from the crystal orientation [110] are prepared, and one of the Si substrates 115 and 116 is subjected to a thermal oxidation to form a $SiO_2$ layer 117. In this embodiment, it is assumed for the sake of convenience that the $SiO_2$ layer 117 is formed on the Si substrate 115 as shown in FIG. 15A. Next, the Si substrates 115 and 116 are directly bonded, for example, and the $SiO_2$ layer 117 is removed at portions other than the bonding surface, as shown in FIG. 15B. As a result, the $SiO_2$ layer 117 is sandwiched between the two Si substrates 115 and 116.

Figure 15C:
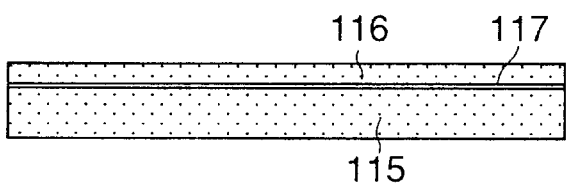
Figure 15D:
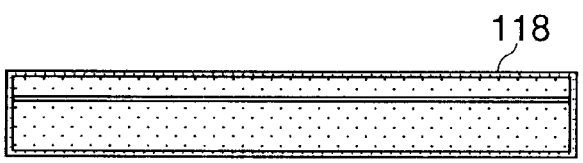
Figure 15E:
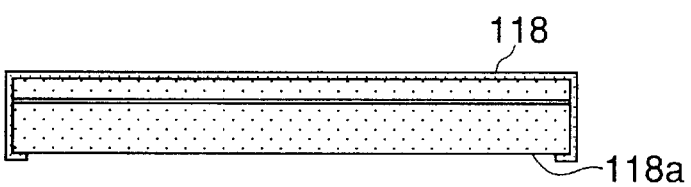

A SiN layer 118 is formed on both sides of the structure shown in FIG. 15B by a LPCVD, to thereby obtain a structure shown in FIG. 15C. Then, a desired pattern 118a is formed in the SiN layer 118 by using a photolithography technique and dry etching of the SiN layer 118, as shown in FIG. 15D. Thereafter, an anisotropic etching is carried out in a KOH solution having a density of 25 wt % at a temperature of 80° C. The anisotropic etching is stopped when the etching of Si progresses and the SiN layer 118 is exposed, as shown in FIG. 15E.

Figure 15F:
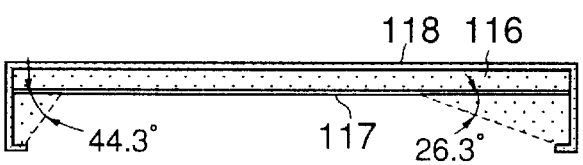
Figure 15G:
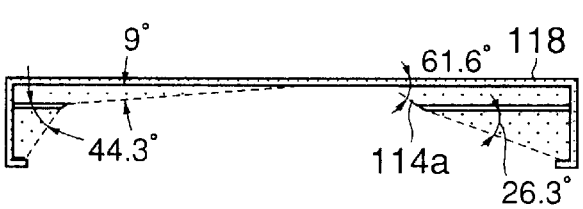

The exposed SiN layer 118 is then removed by etching, and an anisotropic etching is further carried out to obtain a structure shown in FIG. 15F having the opening of the Si substrate covered by the SiN layer 118. An opening 113 is made to penetrate the Si substrate, and the confronting mirror member 110 is completed as shown in FIG. 15G.

By carrying out the anisotropic etching after bonding the two Si substrates, the handling of the substrate becomes easier and the substrate is less likely to be damaged compared to the case where the two Si substrates are bonded after the anisotropic etching. In addition, the production process can be simplified because only one photolithography process is required.

FIGS. 16A through 16F are cross sectional views for explaining the effects of providing a SiO$_2$ layer at a bonding surface between two Si substrates. In FIGS. 16A through 16F, those parts which are the same as those corresponding parts in FIGS. 15A through 15G are designated by the same reference numerals, and a description thereof will be omitted.

Figure 16A:
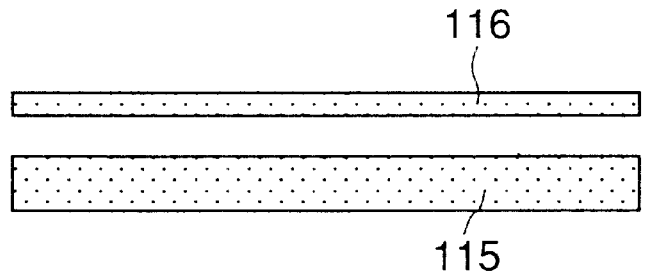
FIGS. 16A through 16F are cross sectional views for explaining the effects of providing a SiO$_2$ layer at a bonding surface between two Si substrates.
Figure 16B:
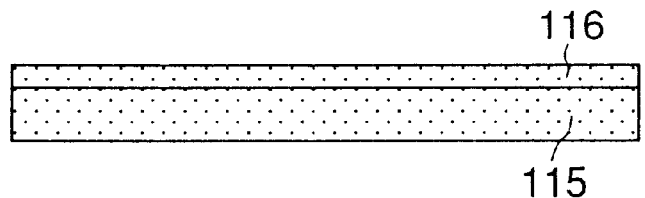

First, Si substrates 115 and 116 which are respectively inclined by slice angles of 26.3 degrees and 9 degrees from the crystal orientation [110] are prepared as shown in FIG. 16A. No SiO$_2$ layer is positively formed between the Si substrates 115 and 116 and the Si substrates 115 and 116 are directly bonded as shown in FIG. 16B. Hence, only a natural oxidation layer, namely, a thin SiO$_2$ layer, is formed at the bonding interface of the two Si substrates 115 and 116. The etching rate of SiO$_2$ is extremely slow compared to that of Si, and is approximately 1/200 depending on the etching conditions.

Figure 16C:
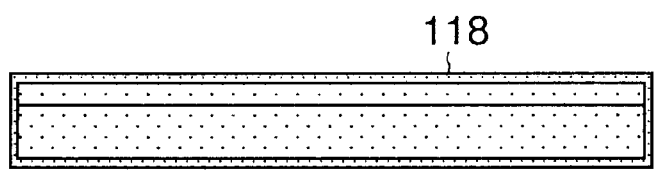
Figure 16D:
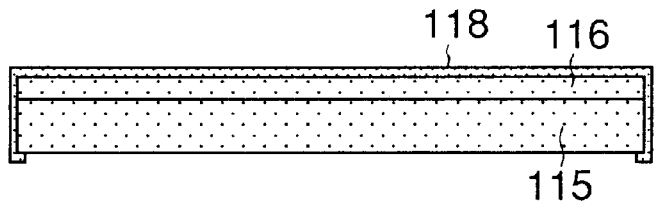
Figure 16E:
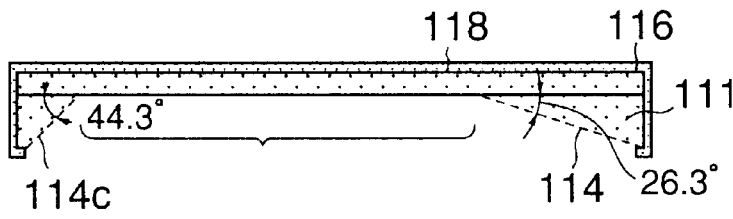

A SiN layer 118 is formed on both sides of the structure shown in FIG. 16B by a LPCVD, to thereby obtain a structure shown in FIG. 16C. Then, a desired pattern 118a is formed in the SiN layer 118 by using a photolithography technique and dry etching of the SiN layer 118, as shown in FIG. 16D. Thereafter, an anisotropic etching is carried out in a KOH solution having a density of 25 wt % at a temperature of 80° C. The anisotropic etching is stopped when the etching of Si progresses and the SiN layer 118 is exposed, as shown in FIG. 16E. But when the thin SiO$_2$ layer formed at the bonding interface of the two Si substrates 115 and 116 is not uniform, the etching amount of the anisotropic etching becomes considerably inconsistent. As a result, the angles formed between the substrate 116 and the reflecting surfaces 114 and 114c may become inconsistent due to the inconsistent etching amount, as shown in FIG. 16E.

Figure 16F:
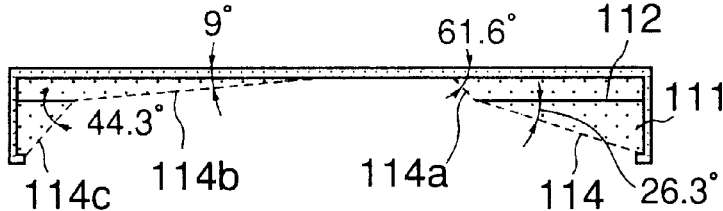

On the other hand, when the SiO$_2$ layer 117 is positively formed at the bonding interface of the two Si substrates 115 and 116, and the SiO$_2$ layer 117 is removed when the SiO$_2$ layer 117 becomes exposed and the anisotropic etching is carried out again, it is possible to accurately control the etching amount at the joining portion of the tapered surfaces 114 and 114a and a joining portion of the tapered surfaces 114b and 114c, as shown in FIG. 16F. If no SiO$_2$ layer or only the thin SiO$_2$ layer (natural oxidation layer) remains at the bonding interface of the two Si substrates 115 and 116, the etching may progress from the interface of the two Si substrates 115 and 116 that is exposed by the anisotropic etching, to deteriorate the accuracy of the tapered surfaces 114, 114a, 114b and 114c. But by positively providing the SiO$_2$ layer 117 at the bonding interface of the two Si substrates 115 and 116, it is possible to accurately control the angle of the tapered surfaces 114, 114a, 114b and 114c at the time of the etching.

The material of an interposed layer, that is, the SiO$_2$ layer 117, which is positively provided at the bonding interface of the two Si substrates 115 and 116 is not limited to SiO$_2$, and any suitable material may be used as long as the material has a selective etching characteristic with respect to Si and enables bonding of the two Si substrates 115 and 116 via the material. For example, Si$_x$N$_y$, Si$_x$O$_y$N$_z$, SiC, SiO$_x$ and the like may be used for such a material, in addition to SiO$_2$.

The provision of the interposed layer, that is, the SiO$_2$ layer 117, which is positively provided at the bonding interface of the two Si substrates 115 and 116, also reduces bonding defects such as a void and improves the bonding reliability, compared to the case where the two Si substrates 115 and 116 are bonded to be in direct contact without the interposed layer, even when the relatively simple but reliable direct bonding technique is employed. Accordingly, the second embodiment of the method described above can simplify the production process by carrying out the anisotropic etching after bonding the two Si substrates 115 and 116 via the interposed SiO$_2$ layer 117. Moreover, compared to the case where the two Si substrates 115 and 116 are bonded after forming the reflecting surfaces and the opening, it is easier to handle the substrate, and the possibility of damaging the substrate is reduced. Also, since the process of forming the reflecting surfaces occurs at the latter part of the entire production process, it is easier to obtain clean reflecting surface.

FIGS. 17A through 17G are cross sectional views for explaining a third embodiment of the method of producing the optical unit according to the present invention. It is assumed for the sake of convenience that this third embodiment of the method produces the confronting mirror member 110 to be used in the mirror unit 101 shown in FIG. 18 which will be described later. More particularly, this third embodiment of the method produces the confronting mirror member (fixed mirror) which confronts the torsion mirror of the optical deflecting unit. In FIGS. 17A through 17G, those parts which are the same as those corresponding parts in FIGS. 15A through 15G are designated by the same reference numerals, and a description thereof will be omitted.

Figure 17A:
FIGS. 17A through 17G are cross sectional views for explaining a third embodiment of the method of producing the optical unit according to the present invention.
Figure 17B:
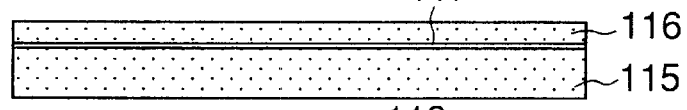
Figure 17C:
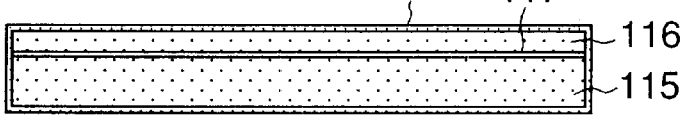
Figure 17D:
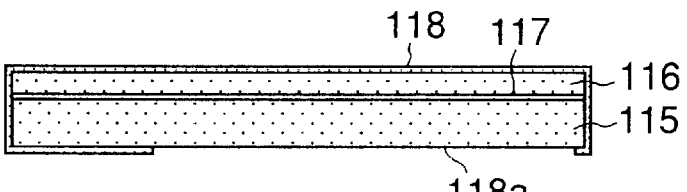
Figure 17E:
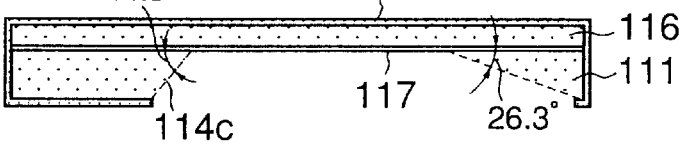

The processes from the state shown in FIG. 17A to the state shown in FIG. 17E are the same as those of the states shown in FIGS. 15A through 15E. After the first anisotropic etching ends, the exposed SiO$_2$ layer 117 is removed by etching. Then, a further anisotropic etching is carried out to form the other reflecting surface, and the Si substrate 116 is not penetrated, as shown in FIG. 16F. Finally, the SiN layer 118 is removed by etching, and a dry etching is carried out to penetrate the Si substrate 116, so as to complete the confronting mirror member 110 as shown in FIG. 17G.

Figure 17F:
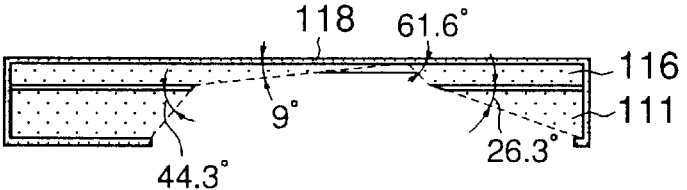
Figure 17G:
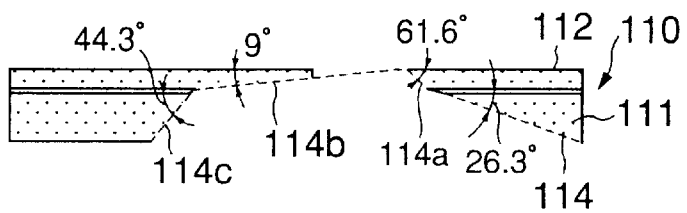

In FIG. 17F, the anisotropic etching does not penetrate the Si substrate 116 to form an opening, in order to reduce the area of the tapered surfaces (reflecting surfaces), that is, to reduce the chip size, as may be seen by comparing FIG. 15G and 17G. By employing a technique other than the anisotropic etching, namely, the dry etching in this third embodiment of the method, it is possible to increase the degree of freedom of design of the pattern of the opening in the Si substrate 116. When the Si substrate 116 is penetrated by the anisotropic etching to define the opening by the tapered surfaces, the opening is affected by the inconsistency in the thickness of the Si substrate 116. But in this third embodiment of the method, it is possible to match the positional relationships of the required reflecting surfaces and the opening with a high accuracy. Hence, by providing the interposed layer having the selective etching characteristic with respect to Si at the bonding interface of the two Si substrates 115 and 116, it is possible to accurately control the etching amount of Si and to reduce the etching inconsistency. Moreover, it is possible to prevent the etching from progressing from the interface of the two Si substrates 115 and 116 that is exposed by the anisotropic etching, which would otherwise deteriorate the accuracy of the tapered surfaces 114, 114a, 114b and 114c. The provision of the interposed layer, that is, the SiO$_2$ layer 117, which is positively provided at the bonding interface of the two Si substrates 115 and 116, also reduces bonding defects such as a void and improves the bonding reliability, compared to the case where the two Si substrates 115 and 116 are bonded to be in direct contact without the interposed layer, even when the relatively simple but reliable direct bonding technique is employed. Furthermore, this third embodiment of the method described above can simplify the production process because the tapered surfaces which form the reflecting surfaces and the opening can be formed simultaneously by penetrating the Si substrate 116 by the anisotropic etching.

The first through third embodiments of the method described above produce the confronting mirror member 110 using two Si substrates. However, the method used to form the tapered surfaces is not limited to the anisotropic etching, and the material of the substrates used is not limited to Si, as long as it is possible to form the tapered surfaces having the desired functions. For example, a LIGA (Lithographic Galvano formung und Abformung) process, an ejection molding process, an optical shaping process and the like may be used to form the tapered surfaces, and materials other than Si may be used for the substrates. When the tapered surfaces are integrally formed on the substrate, it is possible to reduce the production cost.

When the Si substrate is used to form the reflecting surfaces and a substrate which forms the confronting torsion mirror and pivotally supports the torsion mirror is also made of Si, it is possible to bond these Si substrates in the wafer state. For this reason, it is possible to improve the assembling efficiency and to reduce the stress between the Si substrates which are bonded because the bonded substrates are made of the same material. The improved assembling efficiency means that a large number of confronting mirror members can be bonded to the substrate forming the confronting torsion mirror and pivotally supporting the torsion mirror even when the chip size is small, and that the alignment of the confronting mirror members is facilitated. In addition, the area of the tapered surfaces forming the reflecting surfaces can be reduced, to thereby reduce the chip size.

Moreover, when the dry etching is used to form the opening in the substrate, it is possible to improve the freedom of design of the pattern of the opening. Further, it is possible to match the positional relationships of the required reflecting surfaces and the opening. Compared to the case where the opening is defined by penetrating the substrate by the anisotropic etching, the opening is unaffected by the inconsistency in the thickness of the substrate when the opening is formed by the dry etching, and it is therefore possible to improve the design margin.

Next, a description will be given of the mirror unit 101 which is formed by assembling therein the confronting mirror member 110 which is formed by any of the first through third embodiments of the method described above, and an optical scanning unit 120 which is formed by assembling therein the mirror unit 101.

Figure 18:
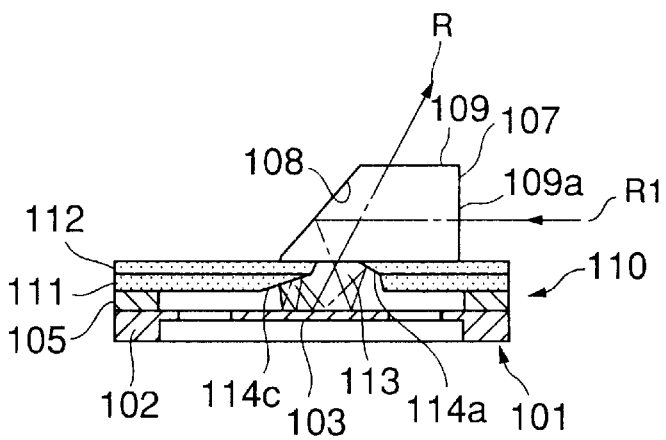
FIG. 18 is a cross sectional view showing a mirror unit.
Figure 19:
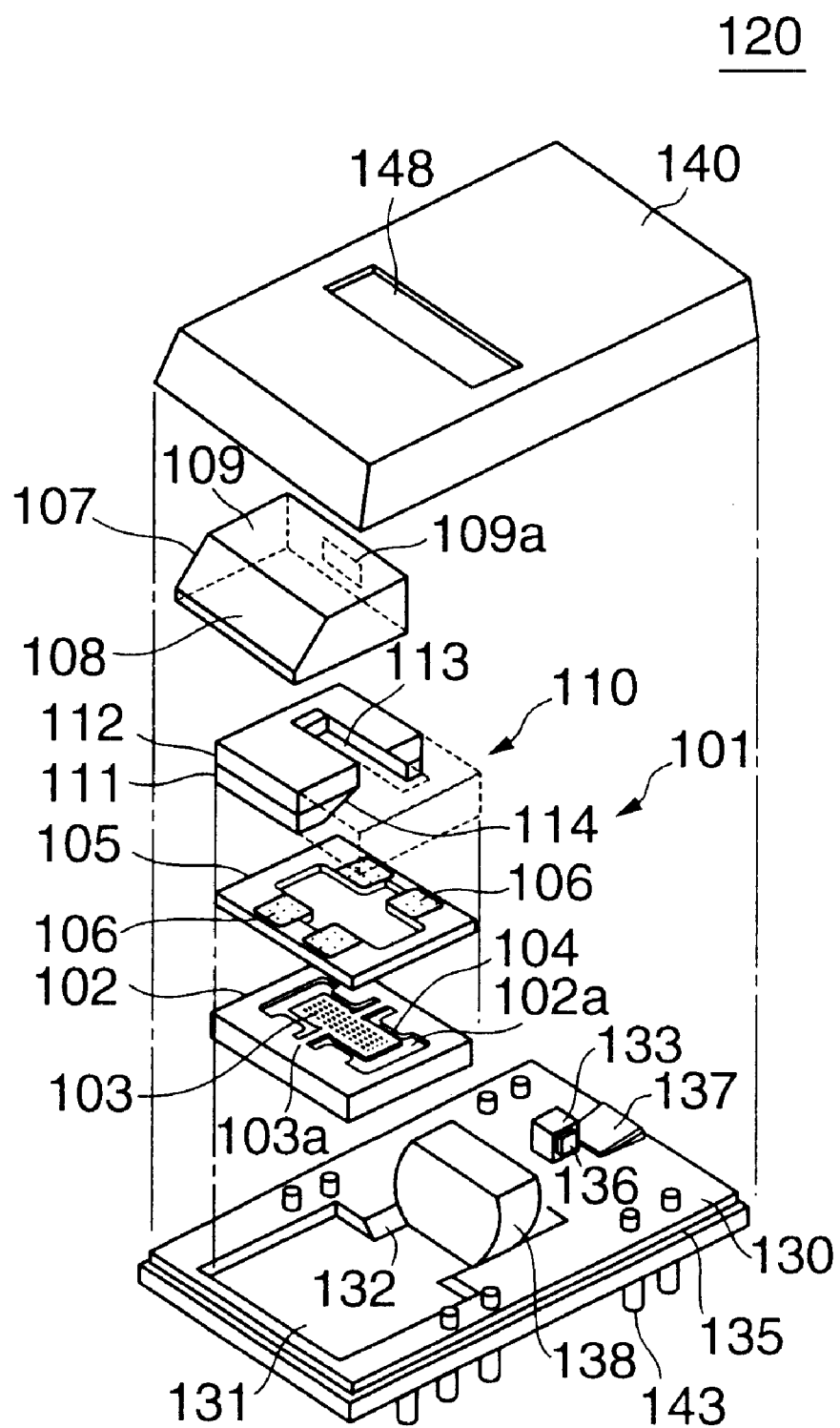
FIG. 19 is a disassembled perspective view showing the optical scanning unit.

FIG. 18 is a cross sectional view showing the mirror unit 101. FIG. 19 is a disassembled perspective view showing the optical scanning unit 120.

In the mirror unit 101 shown in FIG. 18, a torsion mirror substrate 102, an electrode substrate 105, and the two substrates 111 and 112 of the confronting mirror member 110 are stacked, and a prism 107 is further provided on the stacked structure for inputting and outputting the laser beam to and from the mirror unit 101. The torsion mirror substrate 102 is arranged at the lower end of the confronting mirror member 110, and a torsion mirror 103 is provided at a central portion of the torsion mirror substrate 102. The tapered surface 114a and the like are formed at the opening 113 above the torsion mirror 103 via the electrode substrate 105.

An incoming light beam R1 from a laser beam generating means (not shown) reaches the optical unit 101 via a reflecting surface 108 of the prism 107, and is output as a scanning light beam R towards the upper portion of the prism 107 after being reflected a plurality of times by the torsion mirror 103 and the tapered surfaces 114a and the like of the confronting mirror member 110.

As shown in FIG. 19, the torsion mirror substrate 102 is formed by etching a Si substrate to remove a rectangular portion from the back side of the Si substrate to form a space 102a which is left with a frame portion and a top plate portion having a predetermined thickness. The torsion mirror 103 and torsion bars 103a which pivotally supports the torsion mirror 103 are formed by penetrating the periphery of the top plate portion. A reflecting surface is formed on the central portion of the torsion mirror 103 by forming a metal film by evaporation, for example. A movable electrode 104 is formed on both end surfaces of the torsion mirror 103 where the torsion bars 103a connect. A hollow portion on the back side of the Si substrate forms a space for permitting a pivotal movement of the torsion mirror 103. The electrode substrate 105 which is located above the torsion mirror substrate 102 has a central portion thereof penetrated to form a space for permitting the pivotal movement of the torsion mirror 103. Fixed electrodes 106 are formed to confront the ends of the movable electrode 104 with a predetermined gap formed therebetween so that the electrodes 105 and 106 do not make contact with each other when the torsion mirror 103 pivots.

The confronting mirror member 110 which is formed by bonding the two Si substrates 111 and 112, is bonded on the top surface of the electrode substrate 105. Wafers which are respectively inclined by the slide angle of approximately 9 degrees from the crystal orientation [111] are used for the first and second substrates 111 and 112 of the confronting mirror member 110, and tapered surfaces 114b and 114 which are respectively inclined by 9 degrees and 26.3 degrees from the respective substrate surfaces are formed by etching. The tapered surfaces 114b and 114 are formed into the reflecting surfaces by depositing a metal film by evaporation, for example. The opening 113 through which the light beam passes is formed by penetrating the second substrate 112 adjacent to the tapered surface 114a. The tapered surfaces 114b and 114 which are respectively inclined by 9 degrees and 26.3 degrees from the respective substrate surfaces are formed by etching. The tapered surfaces 114b and 114 are formed into the reflecting surfaces by depositing a metal film by evaporation, for example. The tapered surfaces 114b and 114c which form an angle of 144.7 degrees are arranged on the opposite side from the tapered surfaces 114a and 114 via the opening 113.

The prism 107 has an incident surface 109a to which the light beam R1 is input, an exit surface 109, a reflecting surface 108 for reflecting the light beam towards the torsion mirror 103, and a connecting surface which connects to the top surface of the confronting mirror member 110. The prism 107 is positioned and fixed on the top surface of the second substrate 112.

In the case shown in FIG. 18, the incoming light beam which is input from the opening 113 of the confronting mirror member 110 towards the torsion mirror 103 at a predetermined angle (20 degrees in this case) is reflected by the tapered surface 114a which forms the reflecting surface, and is again reflected by the torsion mirror 103. In this manner, the reflection of the light beam is repeated a plurality of times (three times in this case) between the tapered surface 114c which forms the reflecting surface and the torsion mirror 103. The reflection position moves back and forth in the sub scan direction, so that the light beam again passes through the opening 113 and reaches the prism 107 to exit from the exit surface 109.

The light beam further passes through a glass plate 148 which is provided in an opening of a cover 140 as shown in FIG. 19 and travels upwards, to be output as the scanning light beam R as shown in FIG. 18. Hence, by repeating the reflection of the light beam a plurality of times between the confronting mirror member 110 and the torsion mirror 103, it is possible to obtain a large scan angle by a small pivotal angle of the torsion mirror 103. For example, when the total number of reflections by the torsion mirror 103 is denoted by N and the pivotal angle of the torsion mirror 103 is denoted by A, the scan angle B can be described by B=2NA. In the case shown in FIG. 18, N=5.

In the optical scanning unit 120 shown in FIG. 19, an electrostatic attracting force is generated between the fixed electrodes 106 of the torsion mirror 103 and the confronting movable electrode 104 when a voltage is applied to one of the fixed electrodes 106. This electrostatic attracting force twists the torsion bars 103*a*, and the torsion mirror 103 is pivoted from a horizontal state to a state where the electrostatic attracting force and the torsion force of the torsion bars 103*a* become balanced. Next, when the applied voltage is cancelled, the torsion bars 103*a* are restored by the torsion force and the torsion mirror 103 is returned to the horizontal state. If the voltage is applied to the other of the fixed electrodes 106, the torsion bars 103*a* are twisted in the opposite direction to the above, thereby pivoting the torsion mirror 103 in the opposite direction. Therefore, by periodically switching the fixed electrode 106 to which the voltage is applied, it is possible to pivot the torsion mirror 103 to undergo a reciprocating movement.

A resonant state occurs when the frequency at which the voltage is applied to the fixed electrodes 106 approaches the natural oscillation frequency of the torsion mirror 103. In this resonant state, the pivotal angle of the torsion mirror 103 is amplified over the displacement due to the electrostatic attracting force, and the pivotal angle is greatly increased. In addition, the natural oscillation frequency of the torsion mirror 103 is set to suit scanning speed or the recording speed of the image forming apparatus, by appropriately determining the thickness of the torsion mirror 103, the thickness of the torsion bars 103*a*, and the length of the torsion bars 103*a*.

Generally, a maximum pivotal angle Amax of the torsion mirror 103 can be described by Amax=T/K, where K=G(I/L), G denotes an elastic constant of the torsion bar 103*a*, I denotes a cross sectional secondary moment of the torsion bar 103*a*, K denotes a spring constant which is determined by a length of the torsion bar 103*a*, and T denotes a torque which is given by the electrostatic attracting force. In addition, if a moment of inertia of the torsion mirror 103 is denoted by J, a resonant frequency fd of the torsion mirror 103 can be described by fd=$(K/J)^{1/2}$. As described above, the applied voltage may be made small by utilizing the resonance and heat generated thereby is small. However, as the scanning speed or the recording speed of the image forming apparatus increases, the rigidity of the torsion bars 103*a* increases to make it difficult to obtain a large pivotal angle of the torsion mirror 103. But by providing the confronting mirror member 110 as described above, it is possible to greatly increase the scan angle, and a sufficiently large scan angle can be obtained regardless of the scanning speed or the recording speed.

Figure 20A:
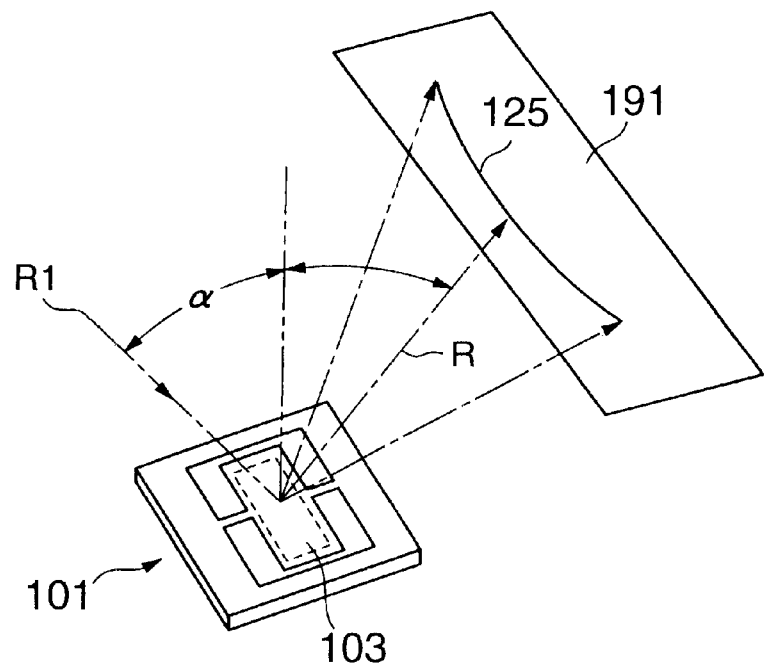
FIGS. 20A and 20B are diagrams for explaining a write operation of the optical scan unit.
Figure 20B:
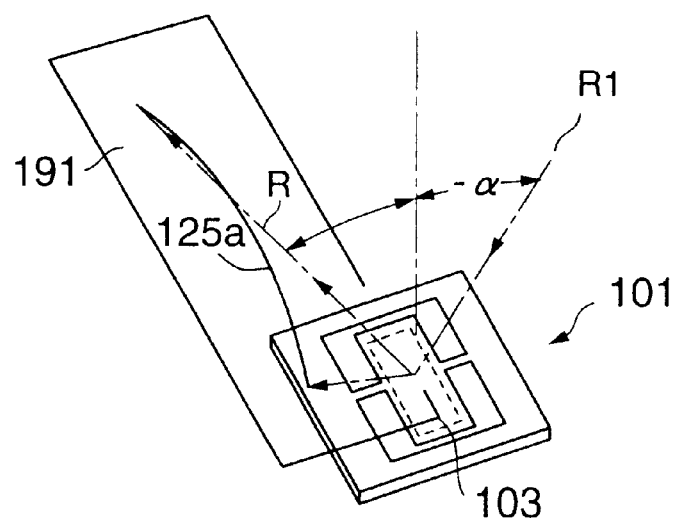

FIGS. 20A and 20B are diagrams for explaining a write operation of the optical scan unit. FIG. 20A shows a case where the incoming light beam R1 is incident to the torsion mirror 103 of the mirror unit 101 at an angle a in the sub scan direction with respect to a normal to the torsion mirror 103, where the normal is indicated by a two-dot chain line. In this case, the scanning light beam R scans along a scanning line 125 on a photoconductive body 191. This scanning line 125 is curved. Similarly, FIG. 20B shows a case where the incoming light beam R1 is incident to the torsion mirror 103 of the mirror unit 101 at an angle −α in the sub scan direction with respect to the normal to the torsion mirror 103, where the normal is indicated by a two-dot chain line. In this case, the scanning light beam R scans along a scanning line 125*a* on the photoconductive body 191. This scanning line 125*a* is also curved.

Therefore, it may be seen that the scanning line 125 (or 125*a*) on the photoconductive body 191 can be corrected to be linear, by making the curve caused by the reflections of the incoming light beam R1 having a positive incident angle with respect to the normal to the torsion mirror 103 approximately the same as the curve caused by the reflections of the incoming light beam R1 having a negative incident angle with respect to the normal to the torsion mirror 103 and mutually cancelling the curves. More particularly, the reflecting surfaces of the confronting mirror member 110, which are inclined by predetermined angles in the sub scan direction, are disposed to confront the torsion mirror 103, so as to reflect the incoming light beam R1 to reverse the positive or negative incident angle thereof before redirecting the light beam to the torsion mirror 103. Accordingly, the configuration of the confronting mirror member 110 described above is desirable from the point of view of making the scanning line linear.

Figure 21:
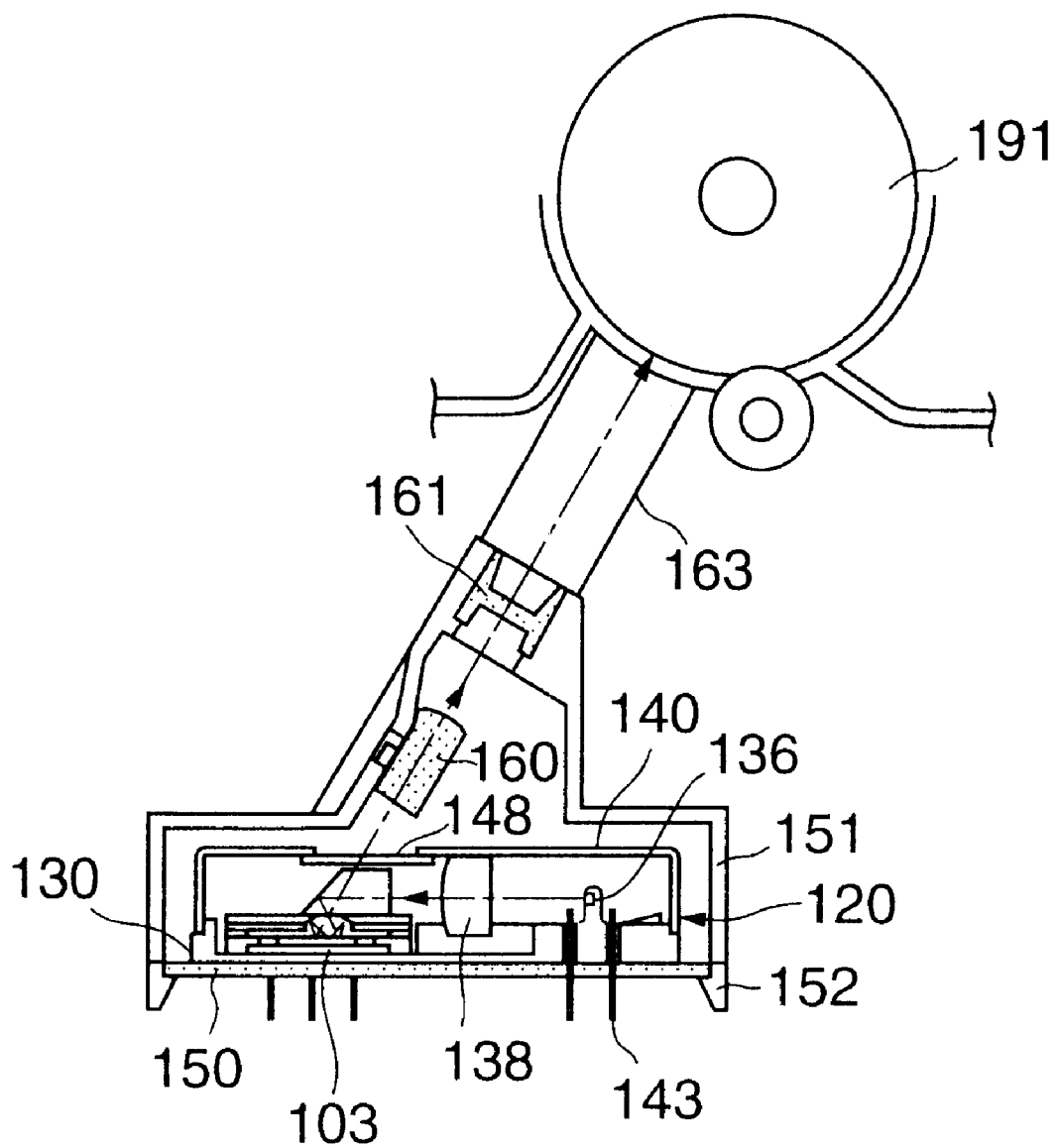
FIG. 21 is a cross sectional view showing the optical scan unit in combination with a photoconductive body.

FIG. 21 is a cross sectional view showing the optical scan unit 120 shown in FIG. 19 in combination with the photoconductive body 191 such as a photoconductive drum. As shown in FIGS. 19 and 21, a support substrate 130 made of sintered metal or the like is disposed under the optical scanning unit 120, and lead terminals 143 are inserted into the support substrate 130 via an insulator material. A bonding surface 131 on which the mirror substrate 105 described above is bonded, a V-shaped groove (or sloping support surfaces) 132 for positioning and fixing a coupling lens 138, and a mounting part 133 for a laser diode chip 136 are provided on the support substrate 130. A mounting surface of the mounting part 133 which receives the laser diode chip 136 is formed perpendicularly to the bonding surface 131. The mounting part 133 also includes a mounting surface fir receiving a monitoring photodiode chip 137 for receiving the back light of the laser diode chip 136. A stepped part 135 is formed on the periphery of the support substrate 130 for locking the lower end portion of the cover 140.

The coupling lens 138 which is arranged between the mirror unit 101 and the laser diode chip 136 has a cylindrical shape with truncated upper and lower portions. This coupling lens 138 has a first surface which is an axially symmetric aspherical surface, and a second surface which is a cylindrical surface having a curvature in the sub scan direction. The width and angle of the coupling lens 138 are set so that an optical axis thereof matches the light emission point of the laser diode chip 136 when the cylindrical outer peripheral surface of the coupling lens 138 contacts the V-shaped groove 132 of the support substrate 130. The coupling lens 138 is adjusted in the direction of the optical axis to adjust the divergent light beam, adjusted in the main scan direction to form an approximately parallel light beam, and adjusted in the sub scan direction so that the light beam is converged on the torsion mirror 103, before being bonded and fixed. The truncated (or cut) surfaces of the coupling lens 138 are formed parallel to a generatrix of the cylindrical surface, so as to position the coupling lens 138 in a direction around the optical axis.

The cover 140 is formed into a cap shape from a sheet metal, for example, so as to cover the mirror unit 101. The glass plate 140 is bonded from the inside of the cover 140 at the opening through which the light beam exits the optical scan unit 120. The cover 140 is fitted over the stepped part 135 which is provided on the outer periphery of the support substrate 130, to form the optical scan unit 120, that is, a single module. The laser diode chip 136, the monitoring photodiode chip 137 and the fixed electrodes 106 are wire-bonded to projecting tip ends of the corresponding lead terminals 143.

Figure 22:
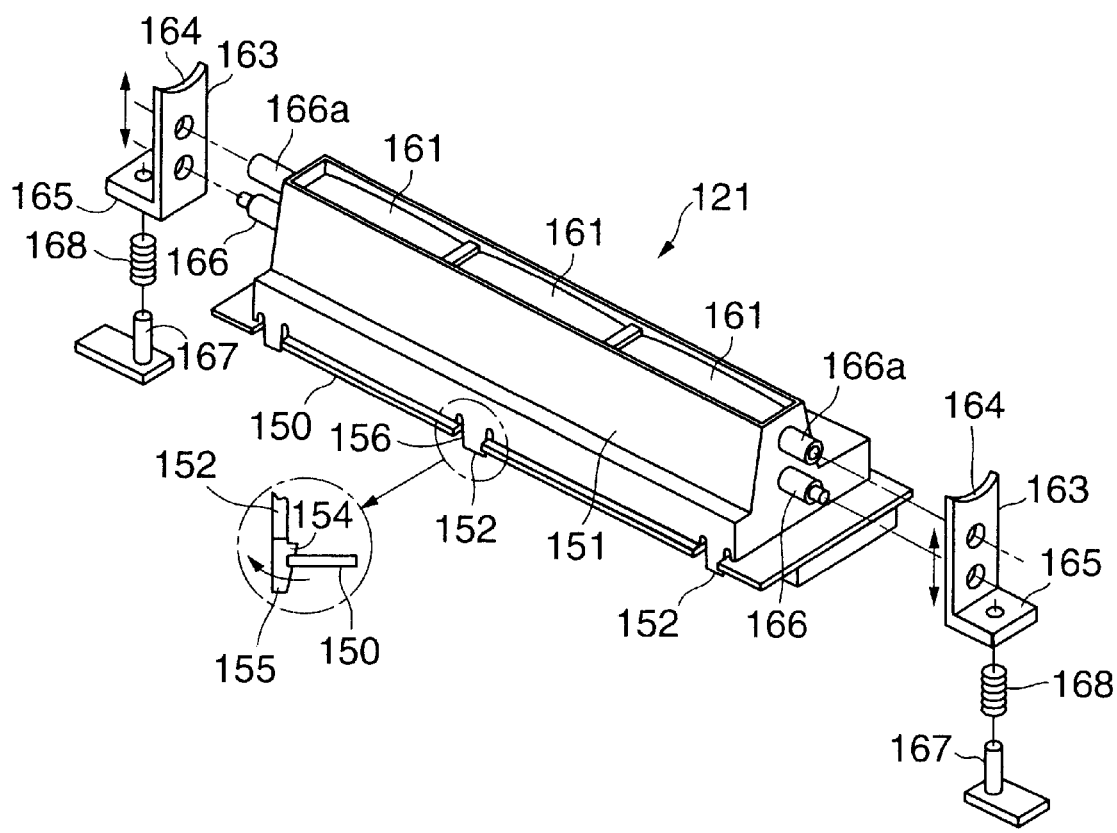
FIG. 22 is a perspective view showing an optical scanning apparatus.
Figure 23:
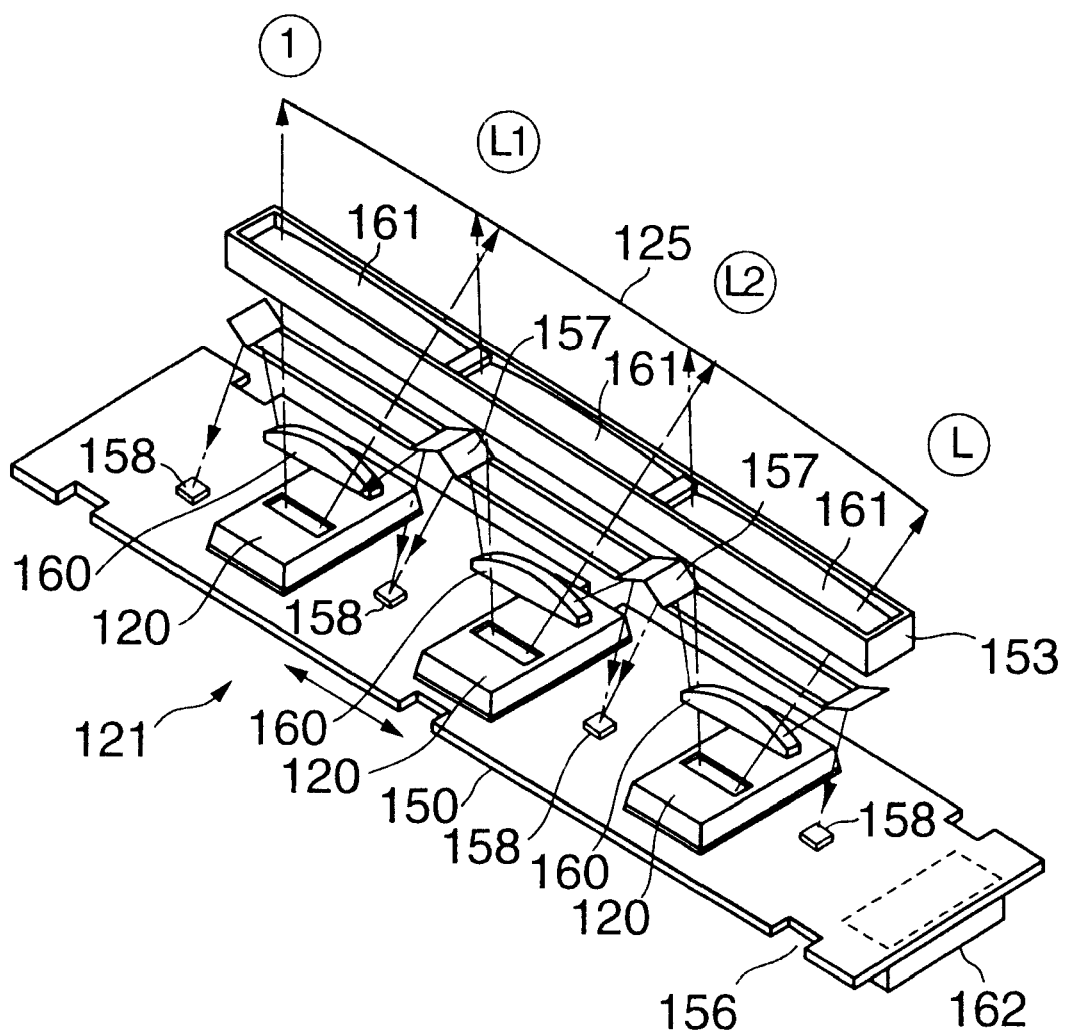
FIG. 23 is a disassembled perspective view showing the optical scanning apparatus.

FIG. 22 is a perspective view showing an optical scanning apparatus 121, and FIG. 23 is a disassembled perspective view showing the optical scanning apparatus 121. As shown in FIGS. 22 and 23, a plurality of optical scanning units 120 are arranged in the main scan direction on a printed circuit board 150 which is mounted with electronic parts forming the driving circuits for the laser diode chips 136, the monitoring photodiode chips 137 and the torsion mirrors 103. In the case shown in FIGS. 22 and 23, three optical scanning units 120 are provided in the optical scanning apparatus 121. When mounting the optical scanning unit 120 on the printed circuit board 150, the bottom surface of the support substrate 130 contacts the top surface of the printed circuit board 130 in a state where the downwardly projecting tip ends of the lead terminals 143 pass through corresponding through-holes in the printed circuit board 150. The optical scanning units 120 are positioned relative to each other and provisionally fixed within a clearance of the through-holes, and are finally fixed by soldering together with the other electronic parts.

The optical scanning units 120 of the optical scanning apparatus 121 scan the photoconductive body 191 (not shown in FIGS. 22 and 23). The scanning lines 125 described above in conjunction with FIGS. 20A and 20B of the optical scanning units 120 are restricted to corresponding scanning ranges, and the optical scanning units 120 are positioned so that no deviation occurs between the scanning lines 125 of the adjacent optical scanning units 120. As shown in FIG. 22, the optical scanning units 120 are positioned on the printed circuit board 150, and a housing 151 having lenses and the like assembled therein is mounted over the optical scanning units 120 so as to form the optical scanning apparatus 121 as a single apparatus.

The printed circuit board 150 which supports the optical scanning units 120 covers the lower opening of the housing 151 in a state where claws 152 of the housing 151 engage corresponding cutouts 156 in the printed circuit board 150. The width of the claw 152 in the main scan direction matches the width of the corresponding cutout 156 in the main scan direction, so as to position the housing 151 in the main scan direction. In addition, a locking part 155 of the claw 152 engages the edge of the printed circuit board 150 as shown on an enlarged scale within a circle indicated by a two-dot chain line in FIG. 22, so as to position the housing 151 in the sub scan direction. When the locking part 155 is bent as indicated by an arrow within the circle indicated by the two-dot chain line in FIG. 22, a projection 154 of the claw 152 pushes down on the top surface of the printed circuit board 150 to thereby facilitate removal of the housing 151 from the printed circuit board 150.

A positioning surface on which first scanning lenses 160 which form imaging means are arranged in the main scan direction and bonded, a positioning part 153 which holds second lenses 161 which form scanning lens means, and a holding part for holding synchronizing mirrors 157 are provided within the housing 151, as may be seen from FIG. 23.

In this embodiment, the second lenses 161 are integrally formed by a resin, and the synchronizing mirrors 157 are connected by a lustered aluminum plate. The second lenses 161 and the synchronizing mirrors 157 are inserted from outside the housing 151 and fitted into the opening of the housing 151 through which the light beams from the optical scanning units 120 exit. A synchronization detecting sensor 158 which is made of a PIN photodiode, for example, is arranged on the printed circuit board 150 at an intermediate position between two adjacent optical scanning units 120 to be shared by the two adjacent optical scanning units 120 and at both ends of each optical scanning unit 120, so that it is possible to detect the light beam at the scan starting position and a scan ending position of each optical scanning unit 120. The synchronizing mirror 157 has an upsidedown V-shape to reflect the light beam of one of the two adjacent optical scanning units 120 at the scan ending position and the light beam of the other of the two adjacent optical scanning units 120 at the scan starting position, towards the shared synchronization detecting sensor 158. A connector 162 projecting downwardly from the printed circuit board 150 in FIG. 23 is used for supplying power to all of the optical scanning units 120 of the optical scanning apparatus 121 and for exchanging image data, control signals and the like.

As shown in FIG. 22, a spacer 163 is provided on both sides of the housing 151. As will be described later in conjunction with FIG. 24, the spacer 163 is used to position the optical scanning apparatus 121 with respect to a cartridge 190 which holds the photoconductive body 191 in accordance with a cylindrical surface of a frame of the cartridge 190 provided concentrically to the photoconductive body 191. The spacer 163 has a vertical part having holes for receiving projecting members 166 and 166a of the housing 151, and the spacer 163 may be secured on the side of the housing 151 by screws. An arcuate surface 164 is formed on the upper end of the vertical part of the spacer 163, and this arcuate surface 164 is pushed Ad against the frame by the action of a coil spring 168 which is inserted between a lower flange 165 of the spacer 163 and a stud 167 provided on a frame of the image forming apparatus shown in FIG. 24. The stud 167 is inserted into a hole in the lower flange 165 of the spacer 163. The optical scanning units 120 can be positively positioned simultaneously with respect to the corresponding scanning surfaces (photoconductive bodies 191) by using the positioning means of the housing and adjusting the mounting state of the optical scanning apparatus 121 with respect to the image forming apparatus.

Figure 24:
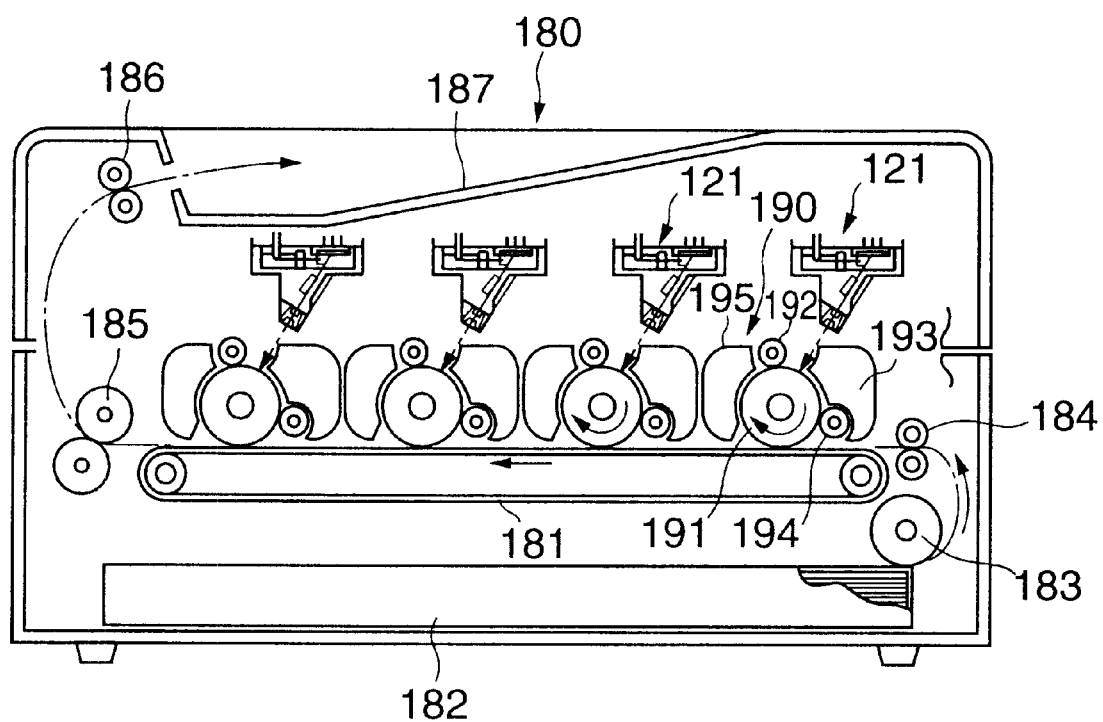
FIG. 24 is a diagram showing an important part of a second embodiment of the image forming apparatus according to the present invention.

FIG. 24 is a diagram showing an important part of a second embodiment of the image forming apparatus according to the present invention. In this second embodiment of the image forming apparatus, the present invention is applied to a color laser printer.

A color laser printer 180 shown in FIG. 24 includes four optical scanning apparatuses 121, four photoconductive bodies 191 and four cartridges 190, which are provided with respect to the printing colors yellow, magenta, cyan and black, and are independently positioned. The optical scanning apparatuses 121, the, photoconductive bodies 191 and the cartridges 190 are arranged in series in the transport direction of the recording medium. The recording medium is supplied from a paper supply tray 182 by a paper supply roller 183, and fed by a resist roller pair 184 in synchronism with a printing timing, and transported on a transport belt 181. Each photoconductive body 191 electrostatically transfers an image of a corresponding color depending on the image data input to the corresponding optical scanning apparatus 121 as the recording medium passes a confronting position. The recording medium having the four color images transferred thereon in an overlapping manner then passes a fixing unit 185 which fixes the color image. The recording medium is thereafter ejected onto a paper eject tray 187 by eject rollers 186.

Each of the cartridges 190 have the same structure, and only the color of the toner accommodated therein differs among the four cartridges 190. Each cartridge 190 includes a charging unit 191 which uniformly charges the surface of the photoconductive body 191, a developing unit 194 which visualizes an electrostatic latent image formed on the photoconductive body 191 by the optical scanning apparatus 121 into a toner image, a toner hopper 193 for supplying the toner, and a cleaning unit 195 which removes the residual toner on the photoconductive body 191 after the toner image is transferred onto the recording medium.

As shown in FIG. 23, one line is formed by connecting the scanning lines 125 of a plurality of optical scanning units 120. In the case shown in FIG. 23, when a total number of dots is denoted by L, first through L1th dots, (L1+1)th through L2th dots, and (L2+1)th through Lth dots are respectively allocated to the three optical scanning units 120 for the printing. In this embodiment, the number of dots allocated to each optical scanning unit 120 is set differently for each color, so that a connecting part of the scanning lines of the different colors do not overlap on the same scanning line. Compared to the conventional image forming apparatus using the polygonal mirror, the color laser printer 180 shown in FIG. 24 has a small power consumption and low printing noise.

The torsion mirror 103 described above is driven by the electrostatic attraction. However, it is possible to drive the torsion mirror 103 by other suitable driving means, such as coils and piezoelectric elements. In other words, a coil may be formed on the torsion mirror 103 so that a magnetic line of force passes in a direction traversing the torsion bar 103a, and an electromagnetic force may be generated by applying a voltage to this coil. On the other hand, a piezoelectric element may be connected to the torsion bar 103a, and the torsion mirror 103 may be driven directly by applying a voltage to the piezoelectric element.

Of course, the number of optical scanning units 120 used in the optical scanning apparatus 121 is not limited to three, and any arbitrary number of optical scanning units 120 may be used in the optical scanning apparatus 121 to suit the recording width of the image forming apparatus.

Figure 25:
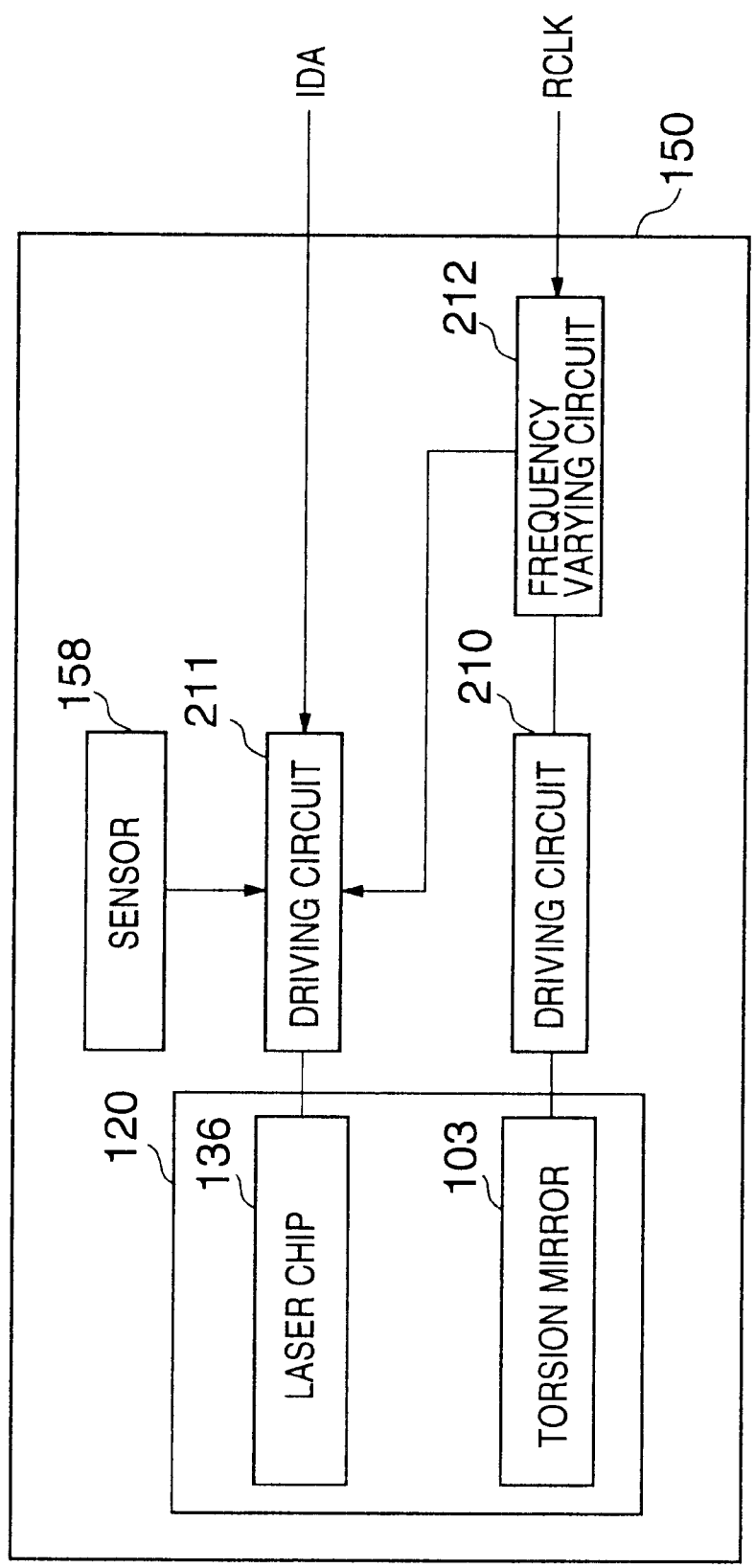
FIG. 25 is a system block diagram showing elements provided on a printed circuit board.

FIG. 25 is a system block diagram showing the elements provided on the printed circuit board 150. As shown in FIG. 25, the optical scan unit 120, the synchronization detecting sensor 158, a torsion mirror driving circuit 210, a laser diode driving circuit 211, and a frequency varying circuit 212. The laser diode driving circuit 211 receives image data IDA via the connector 162 shown in FIG. 23. The frequency varying circuit 212 receives a reference clock RCLK via the connector 162 shown in FIG. 23.

The frequency varying circuit 212 sets a resonant frequency fb to the torsion mirror driving circuit 210 based on the reference clock RCLK. The pivotal angle of the torsion mirror 103 is amplified by pivoting at the resonant frequency fb, and the power consumption is minimized. The pivoting angle of the torsion mirror 103, however, varies slightly depending on each optical scanning unit 120, due to inconsistencies introduced during the production process. For this reason, the scanning frequency fs is set independently for each optical scanning unit 120. A dot pitch P at which the photoconductive body 191 is scanned can be described by $P=fs(L1/fm)E$, where L1 denotes a scanning width, fm denotes a pixel frequency, and E denotes an effective scanning rate. In order to make the dot pitch P constant, it is necessary to vary the pixel frequency fm.

Hence, depending on the scanning frequency fs which is set in the laser diode driving circuit 211, the pixel frequency fm is set to the laser diode driving circuit 211 from the frequency varying circuit 212 based on the reference clock RCLK. The laser diode driving circuit 211 modulates the semiconductor laser of the semiconductor laser chip 136 by the image data IDA based on the pixel frequency fm, at timings determined by a timing signal received from the synchronization detecting sensor 158.

Figure 26:
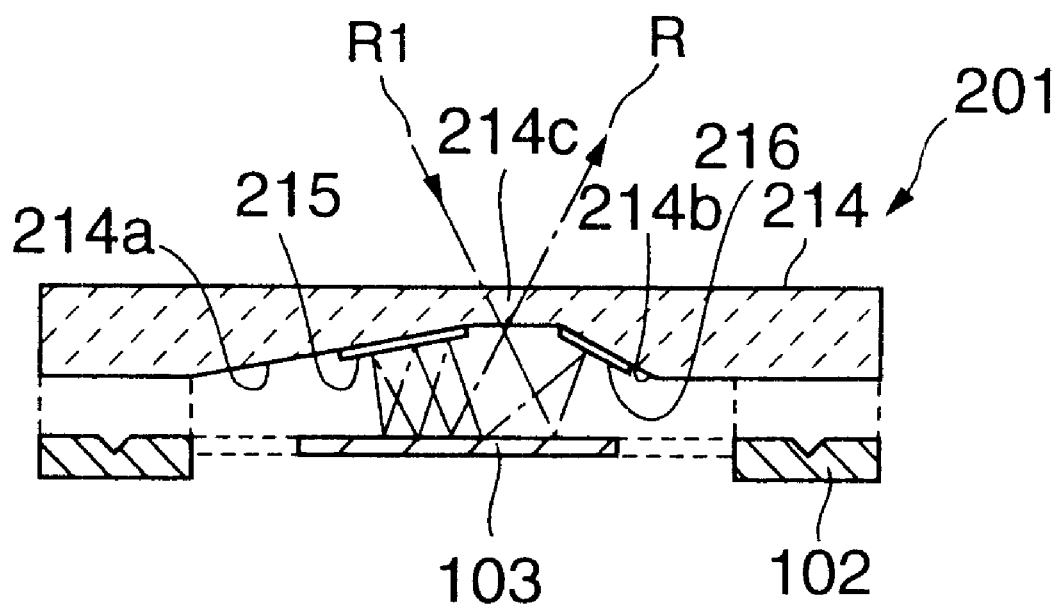
FIG. 26 is a cross sectional view showing a first modification of the mirror unit.

FIG. 26 is a cross sectional view showing a first modification of the mirror unit. In FIG. 26, those parts which are the same as those corresponding parts in FIG. 18 are designated by the same reference numerals, and a description thereof will be omitted.

A mirror unit 201 shown in FIG. 26 includes a confronting mirror member (or substrate) 214 which is made of a sufficiently light transmitting material such as glass and resin. The confronting mirror member 214 has tapered surfaces 214a and 214b, and a light transmitting part 214c between the tapered surfaces 214a and 214b. The thickness of the confronting mirror member 214 is made thin at the light transmitting part 214c. The incoming light beam R1 passes through the light transmitting part 214c and reaches the torsion mirror 103, and the reflected light beam from the torsion mirror 103 passes through the light transmitting part 214c to be output as the scanning light beam R. Reflecting surfaces 215 and 216 are respectively formed on the tapered surfaces 214a and 214b of the confronting mirror member 214. For example, the reflecting surfaces 215 and 216 may be formed by depositing a thin metal film on the tapered surfaces 215 and 216 by evaporation, adhering mirror members on the tapered surfaces 215 and 216, and the like. The tapered surfaces 214a and 214b themselves may function as the reflecting surfaces 215 and 216 depending on the material used for the confronting mirror member 214.

According to the mirror unit 201 shown in FIG. 26, the opening 113 of the mirror unit 101 shown in FIG. 18 is not provided. In other words, the upper portion of the mirror unit 201 is closed by the confronting mirror member 214. As a result, it is possible to prevent deterioration of the surface precision of the reflecting surfaces which may occur in the vicinity of the opening 113, because no opening 113 is provided in the mirror unit 201. In addition, the strength or rigidity of the mirror unit 201 is improved compared to that of the mirror unit 101. Furthermore, the degree of freedom with which the incident angle of the incoming light beam R1 and the exit angle of the scanning light beam R may be set is improved, and the degree of freedom with which the optical paths may be designed is also improved, because the incoming light beam R1 and the scanning light beam R are transmitted through the light transmitting part 214c of the confronting mirror member 214.

In addition, because the upper portion of the mirror unit 201 is closed by the confronting mirror member 214, the mirror unit 201 may be adapted to an air-tight or vacuum sealed structure, to positively and easily seal the torsion mirror 103. If the mirror unit 201 is adapted to the air-tight sealed structure with inert gas injected inside, it becomes possible to improve the operation reliability since the mirror unit 201 is less likely to be affected by the environment such as humidity and temperature. Moreover, if the pivoting space of the torsion mirror 103 is vacuum sealed, it is possible to prevent the pivotal angle of the torsion mirror 103 from decreasing due to the air damping effect.

The tapered surfaces 214a and 214b and the light transmitting part 214c of the confronting mirror member 214 shown in FIG. 26 are integrally formed on the single substrate which is made of the sufficiently light transmitting material. Hence, the number of parts is reduced and the assembling process is simplified, to thereby prevent the production cost from increasing. However, the tapered surfaces 214a and 214b and the light transmitting part 214c may of course be made of different materials and/or different members, and it is still possible in such a case to obtain the effects of closing the upper portion of the mirror unit 201 by the confronting mirror member 214.

Next, a description will be given of the alignment of the confronting mirror member with respect to the torsion mirror substrate which supports the torsion mirror.

FIGS. 27A through 27H are cross sectional views for explaining a method of producing a confronting mirror member 310. It is assumed for the sake of convenience that an opening (or aperture) for receiving the incoming light beam and outputting the scanning light beam is formed in a Si substrate 313 having a crystal orientation [100] by anisotropic etching.

Figure 27A:
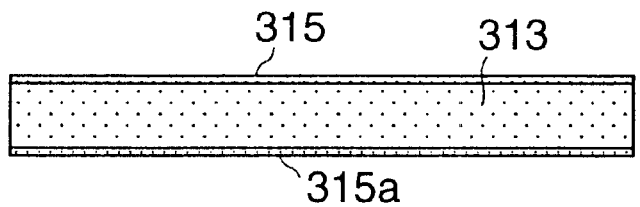
FIGS. 27A through 27H are cross sectional views for explaining a method of producing the confronting mirror member.
Figure 27B:

First, SiN layers 316 and 316a are formed on both sides of the Si substrate 313 by the LPCVD as shown in FIG. 27A. Then, patterns 316 of the opening and alignment holes are formed in the SiN layer 315 by employing the photolithography technique and dry etching of the SiN layer 315, as shown in FIG. 27B. In addition, patterns 316 of only the opening are formed in the SiN layer 315a by similarly employing the photolithography technique and dry etching of the SiN layer 315a, as shown in FIG. 27C.

Figure 27C:
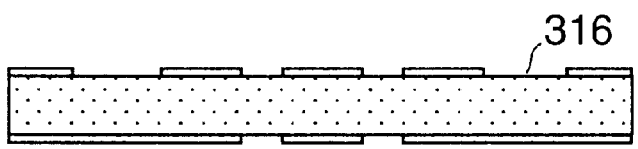

The structure shown in FIG. 27C is subjected to an anisotropic etching from both sides in a KOH solution having a density of 25 wt % at a temperature of 90° C., for example. The anisotropic etching is carried out from both sides of the structure, so that the diameter of the edge of the opening on both sides of the structure is unaffected by the inconsistency in the thickness of the Si substrate 313, and because the area required to form an opening 314 can be reduced. The anisotropic etching also enables the edge of the opening to be formed with a high precision comparable to that of a mask. Furthermore, the anisotropic etching can reduce the etching time, and thus reduce the production cost.

Figure 27D:
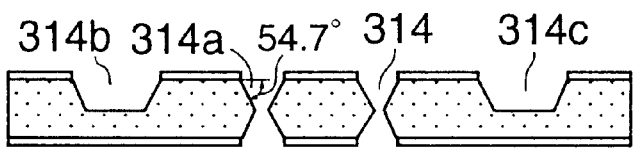
Figure 27E:
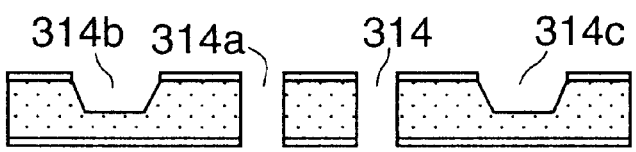
Figure 27F:
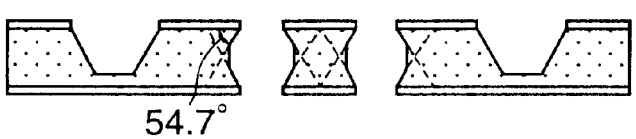
Figure 27G:
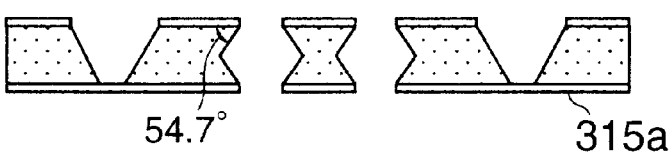
Figure 27H:
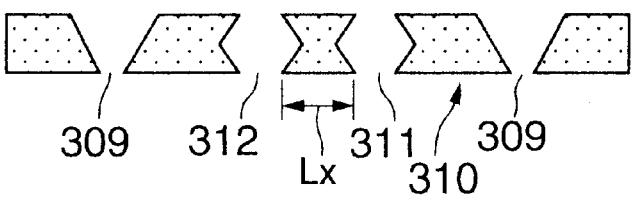

As the anisotropic etching progresses, the Si substrate 313 is etched along the crystal orientation [111] which forms an angle of 54.7 degrees to the substrate surface-and has the extremely slow etching rate. As a result, openings 314 and 314a are formed from both sides of the Si substrate 313 and penetrate the Si substrate 313 at the central portion along the direction of the thickness as shown in FIG. 27D. The etching progresses inside the Si substrate 313 as shown in FIGS. 27E and 27F since the crystal orientation [110] which is perpendicular to the substrate surface having a fast etching rate becomes exposed. When the crystal orientation [111] which forms an angle of 125.3 degrees to the substrate surface again appears, the etching stops automatically as shown in FIG. 27G. Finally, the SiN layers 315 and 315a are removed by wet etching as shown in FIG. 27H, and patterns 311 and 312 of the openings 314 and 314a and patterns 309 of the alignment holes 314b and 314c are formed.

The openings 314 and 314a shown in any of FIGS. 27E, 27F and 27G are satisfactory for use as the opening for permitting the input and output of the light beam to the optical scanning unit. However, the alignment holes 314b and 314c do not yet penetrate the Si substrate 313 in the states shown in FIGS. 27E and 27F. Accordingly, the etching is continued until the state shown in FIG. 27G.

In FIGS. 27A through 27H, the patterns 311 and 312 of the openings 314 and 314a and the patterns 309 of the alignment holes 314b and 314c have the same shape and are located at the same position on both sides of the Si substrate 313. However, by changing the shape and/or location of the patterns 311 and 312 of the openings 314 and 314a, for example, on one side of the Si substrate 313, it is possible to restrict the diameter of the light beam passing through the openings 314 and 314a.

Figure 28A:
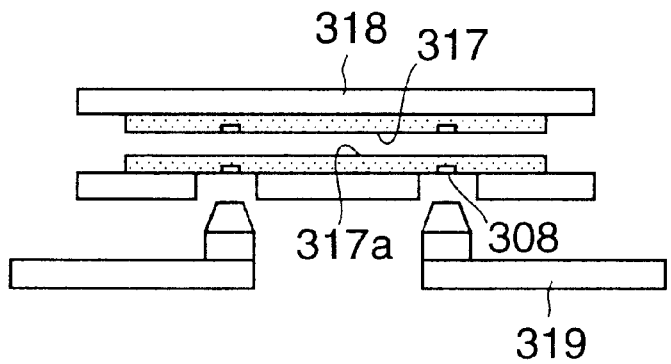
FIGS. 28A through 28C are cross sectional views for explaining alignment methods which are employed when producing the mirror unit.
Figure 28B:
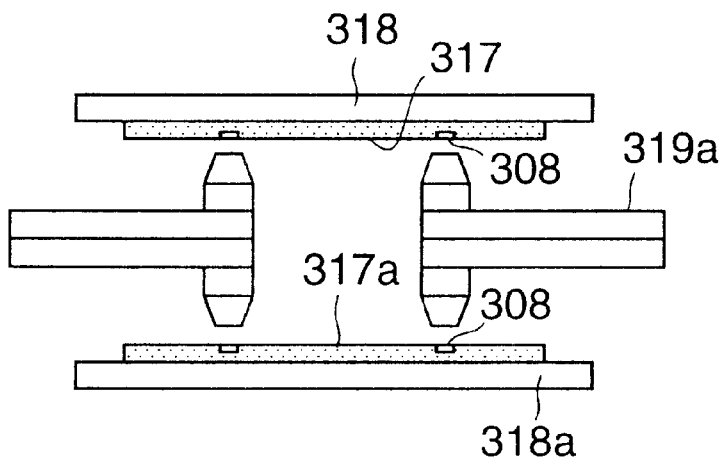
Figure 28C:
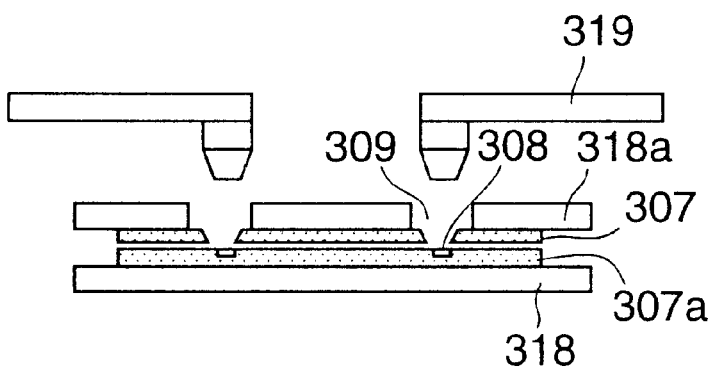

FIGS. 28A through 28C are cross sectional views for explaining alignment methods which are employed when producing the mirror unit. It is assumed for the sake of convenience that the assembling process is carried out in a state where a bonding member 317, 317a or the like is held under suction by suction stages 318 and 318a. Three kinds of alignment methods will be described, depending on the position and shape of an alignment mark 308.

FIG. 28A shows a case where the alignment mark 308 of one member 317 is formed on a bonding surface, and the alignment mark 308 of the other member 317a is formed on a non-bonding surface. In this case, an image of one alignment mark 308 is first input using a microscope 319, and the other alignment mark 308 is read. The positions of the input and read alignment marks 308 are matched, and the two members 317 and 317a are bonded.

FIG. 28B shows a case where the alignment marks 308 are formed on the bonding surfaces of each of the two members 317 and 317a. A microscope 319a is inserted to a position capable of simultaneously viewing the alignment marks 308 of both members 317 and 317a, and the positions of the alignment marks 308 are matched. The microscope 319a is removed from the viewing position, and the two members 317 and 317a are bonded.

FIG. 28C shows a case where the alignment mark 308 of one bonding member 307 is formed by a hole. The alignment mark (hole) 308 can be aligned with respect to an alignment mark of the other bonding member 307a, similarly as when carrying out an alignment in an exposure apparatus. Hence, the bonding members 307 and 307a can be arranged close to each other and the alignment marks 308 can be aligned directly, so that a high-precision alignment is realized.

The alignment method shown in FIG. 28C is desirable than the alignment methods shown in FIGS. 28A and 28B, in that the cost of the equipments required for the alignment is low and the throughput is high when compared to the alignment methods shown in FIGS. 28A and 28B. This is because the alignment method shown in FIG. 28A requires relatively expensive equipments and the throughput is relatively poor, and the alignment method shown in FIG. 28B requires even more complicated and expensive equipments and the mechanical precision of the optical system and the suction states 318 and 318a greatly affect the alignment accuracy. In addition, the alignment method shown in FIG. 28C is desirable in that it is also possible to easily measure an alignment error after the two bonding members 307 and 307a are bonded.

Therefore, by using the alignment holes which have a minimum diameter towards a direction taken along the thickness of the substrate of the optical scanning unit as the alignment marks, it is possible to positively detect the alignment marks and to easily carry out the required alignment. In addition, when aligning first and second substrates which are directly or indirectly bonded, it is possible to reduce the distance between the corresponding alignment marks of the first and second substrates in the direction taken along the thickness of the substrates, and thus, the alignment is facilitated in that the amount of light is increased when detecting the alignment marks by the microscope.

Accordingly, by comparing the alignment methods shown in FIGS. 28A through 28C, it may be seen that the method of producing the confronting mirror member 310 described above in conjunction with FIGS. 27A through 27H is suited for use in combination with the alignment method shown in FIG. 28C, and no additional processes are required to form the alignment marks. In other words, the patterns 309 of the alignment holes 314b and 314c are formed simultaneously as the patterns 311 and 312 of the openings 314 and 314a.

However, when a distance Lx between the patterns 311 and 312 of the openings 314 and 314a is small in FIG. 27H, there is a possibility of the patterns 311 and 312 becoming connected at the central portion of the substrate 313. In order to avoid this situation, it is desirable to one carry out the anisotropic etching halfway after the process described in conjunction with FIG. 27B, and to take measures so that the time required to form the openings 314 and 315a which penetrate the substrate 313 becomes approximately the same as the time required to form the alignment holes 314b and 314c.

In addition, the distance Lx between the patterns 311 and 312 of the openings 314 and 314a in FIG. 27H may be used as the reflecting surface of the confronting mirror member 310. For example, the light beam may enter via the pattern 312 of the left opening 314a, be reflected by the torsion mirror (not shown), and finally exit via the pattern 311 of the right opening 314. In this case, if the diameter of the light beam is to be restricted at the left opening 314a, it is possible to make the distance Lx larger if the diameter of the light beam is restricted at the edge of the left opening 314a closer to the torsion mirror. But when restricting the diameter of the light beam at the edge of the left opening 314a closer to the torsion mirror, the alignment error which is introduced at the time of carrying out the patterning on both sides of the substrate 313 affects the positional accuracy of the light beam and the torsion mirror.

Next, a description will be given of another method of producing the confronting mirror member which is further improved compared to the method described above in conjunction with FIGS. 27A through 27H. FIGS. 29A through 29H are cross sectional views for explaining this other method of producing the confronting mirror member. In FIGS. 29A through 29H, those parts which are the same as those corresponding parts in FIGS. 27A through 27H are designated by the same reference numerals, and a description thereof will be omitted.

Figure 29A:
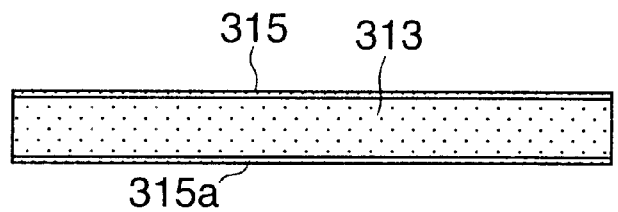
FIGS. 29A through 29H are cross sectional views for explaining another method of producing the confronting mirror member.
Figure 29B:
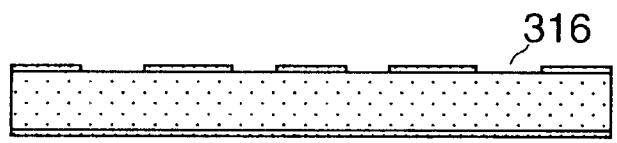
Figure 29C:
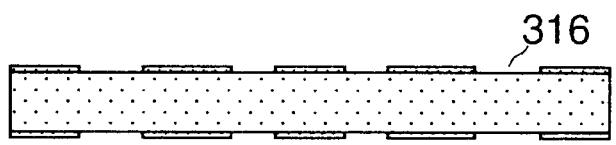
Figure 29D:
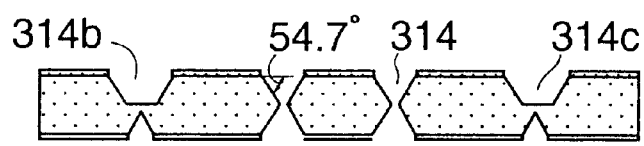

As shown in FIG. 29C, patterns 316 of both the opening and the alignment holes are formed in the SiN layer 315a by employing the photolithography technique and dry etching of the SiN layer 315a. Hence, the alignment holes 314b and 314c are formed by the anisotropic etching from both sides of the substrate 313. As a result, the etching of the substrate 313 progresses as shown in FIGS. 29D through FIG. 29H.

Figure 29E:
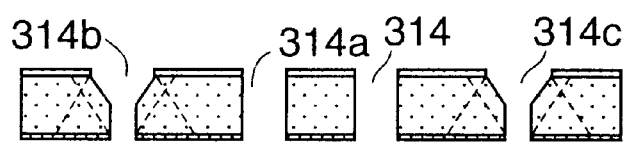
Figure 29F:
Figure 29G:
Figure 29H:
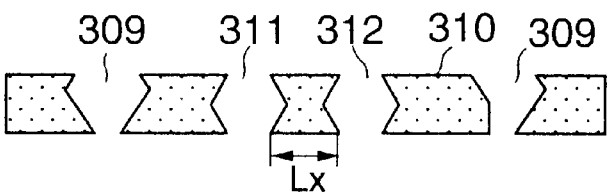

According to this other method of producing the confronting mirror member, a desired shape is obtained, even if the distance Lx between the patterns 311 and 312 of the openings 314 and 314a is small in FIG. 29H, by stopping the etching after the shape shown in FIG. 29E is obtained, and no additional processes are required. In addition, when restricting the diameter of the light beam at the edge of the left opening 314a closer to the torsion mirror, the alignment error which is introduced at the time of carrying out the patterning on both sides of the substrate 313 will not affect the positional accuracy of the light beam and the torsion mirror. Furthermore, the patterns 309 of the alignment marks 314b and 314c on the top surface of the substrate 313 can be made small, to thereby enable reduction in the require area for forming the patterns 309.

Figure 30A:
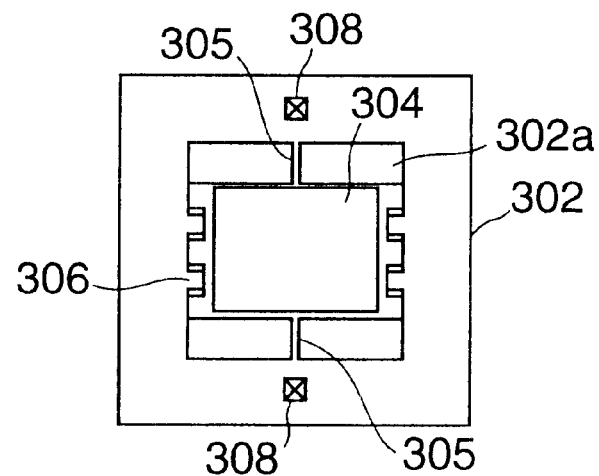
FIGS. 30A through 30C are plan views for explaining members assembled in the mirror unit.
Figure 30B:
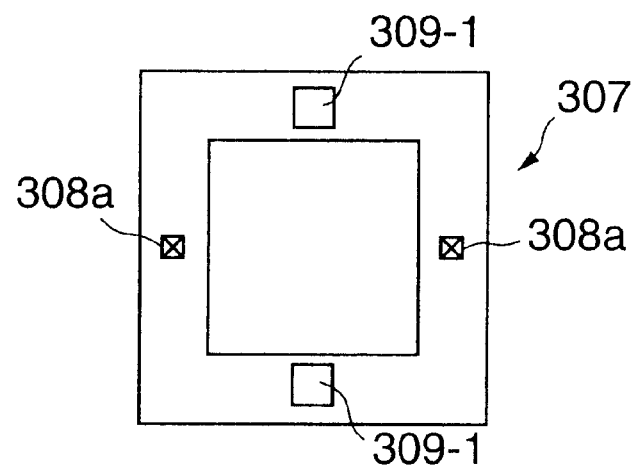
Figure 30C:
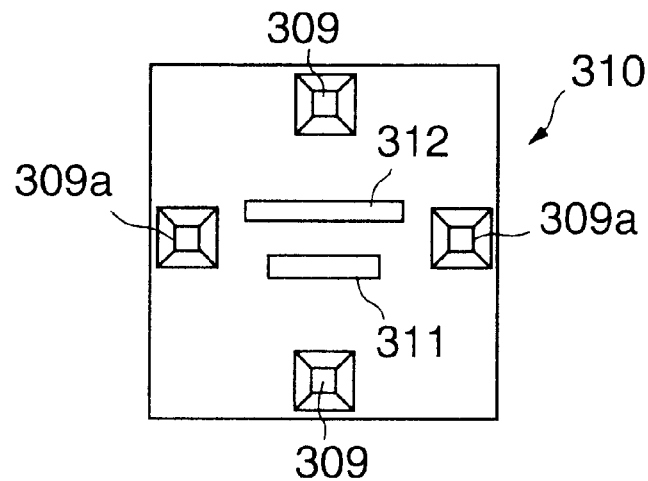
Figure 31A:
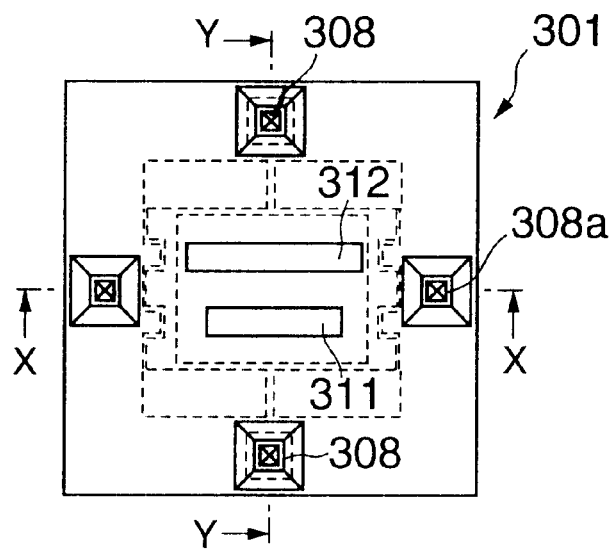
FIGS. 31A through 31C are diagrams for explaining the assembling of the mirror unit.
Figure 31B:
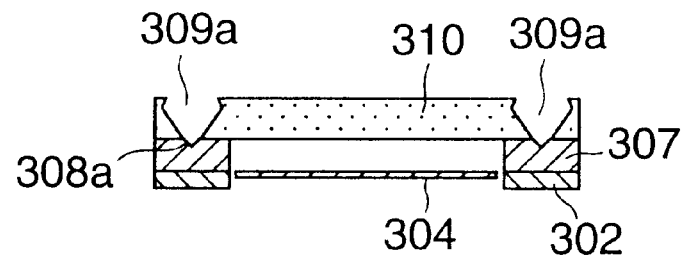
Figure 31C:
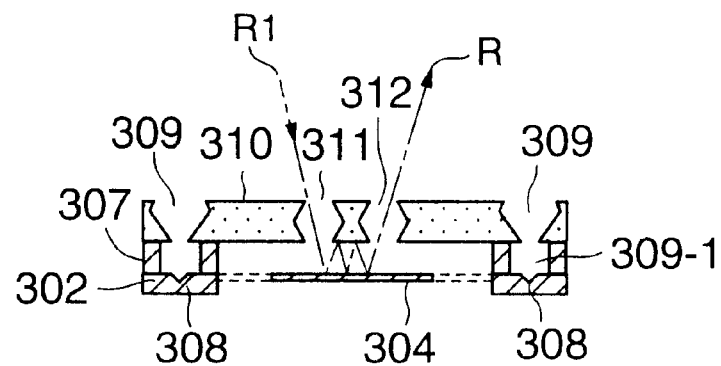

FIGS. 30A through 30C are plan views for explaining members which are produced by the methods described above in conjunction with FIGS. 27A through 27H or FIGS. 29A through 29H and are assembled in the mirror unit. In addition, FIGS. 31A through 31C are diagrams for explaining the assembling of the mirror unit. The confronting mirror member 310 and a torsion mirror substrate 302 are bonded via a spacer (or electrode substrate) 307 so that an arbitrary gap is formed between the confronting mirror member 310 and the torsion mirror substrate 302. FIGS. 30A through 30C respectively show the plan views of the torsion mirror substrate 302, the spacer 307 and the confronting mirror member 310. FIG. 31A shows a plan view of the torsion mirror substrate 302, the spacer 307 and the confronting mirror member 310 in the bonded state. FIG. 31B shows a cross sectional view of the structure shown in FIG. 31A along a line X—X, and FIG. 31C shows a cross sectional view of the structure shown in FIG. 31A along a line Y—Y.

In the torsion mirror substrate 302 shown in FIG. 30A, a torsion mirror 304 is positioned in a central opening 302a of the mirror substrate 302. The torsion mirror 304 is supported by torsion bars 305 with respect to the torsion mirror substrate 302, and has comb-shaped electrodes 306 provided on both sides thereof. Alignment marks 308 are formed on the torsion mirror substrate 302 at the positions shown in FIGS. 30A.

In the spacer 307 shown in FIG. 30B, a central opening 307a is provided at a position corresponding to the central hole 302a of the torsion mirror substrate 302. Alignment holes 309-1 are provided in the spacer 307 at positions corresponding to the alignment marks 308 of the torsion mirror substrate 302. Further, alignment marks 308a are formed on the spacer 307 at the positions shown in FIG. 30B.

In the confronting mirror member 310 shown in FIG. 30C, a plurality of openings or holes are formed as described above in conjunction with FIGS. 27A through 27H or FIGS. 29A through 29H. Alignment holes 309 and 309a are formed at positions respectively corresponding to the alignment holes 309-1 and the alignment marks 308a. In addition, the patterns 311 and 312 of the openings for inputting and outputting the light beam are formed at the central part of the confronting mirror member 310.

First, the spacer 307 and the confronting mirror member 310 are aligned using the alignment marks 308a and the alignment holes 309a, and then bonded by an epoxy bonding agent or the like. The important alignment accuracy which affects the optical characteristics of the optical scanning unit depends on the accuracy of the alignment between the confronting mirror member 310 and the torsion mirror substrate 302. The positioning accuracy of the spacer 307 does not greatly affect the optical characteristics, and the bonding accuracy required between the spacer 307 and the confronting mirror member 310 does not need to be extremely severe. Next, the confronting mirror member 310, which is bonded to the spacer 307, is aligned to the torsion mirror substrate 302 using the alignment marks 308 and 309, and then bonded by an epoxy bonding agent or the like. Because the torsion mirror substrate 302 is the most fragile of the three parts and most likely to be damaged, the torsion mirror substrate 302 is bonded last in this particular case. However, the bonding order of the torsion mirror substrate 302, the spacer 307 and the confronting mirror member 310 is of course not limited to the order described above. In addition, the description given heretofore is related to the bonding for a single chip, but it is of course possible to carry out the bonding in the wafer state.

In FIGS. 27A through 27H, FIGS. 29A through 29H, FIGS. 30A through 30C and FIGS. 31A through 31C, the reflecting surface (fixed mirror surface) of the confronting mirror member 310 corresponds to the single fixed mirror 20F shown in FIG. 10, in order to simplify the description. However, the alignment method can of course be applied similarly to the case where the confronting mirror member 310 corresponds to a plurality of fixed mirrors as shown in FIGS. 7, 12, 18 and 26.

FIGS. 32 through 36 are cross sectional views showing an important part of various embodiments of the mirror unit having a plurality of fixed mirrors.

Figure 32:
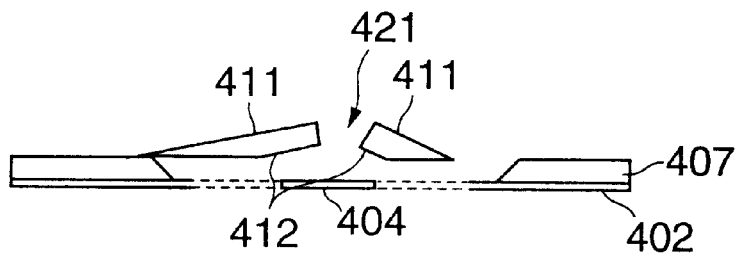
FIG. 32 is cross sectional view showing an important part of one of various embodiments of the mirror unit having a plurality of fixed mirrors.

FIG. 32 shows a mirror unit having a torsion mirror substrate 402 with a torsion mirror 404, a spacer (or electrode substrate) 407, and mirror members 411 having fixed reflecting surfaces (fixed mirrors) 412. An opening 421 for inputting and outputting the light beam is provided between the mirror members 411.

Figure 33:
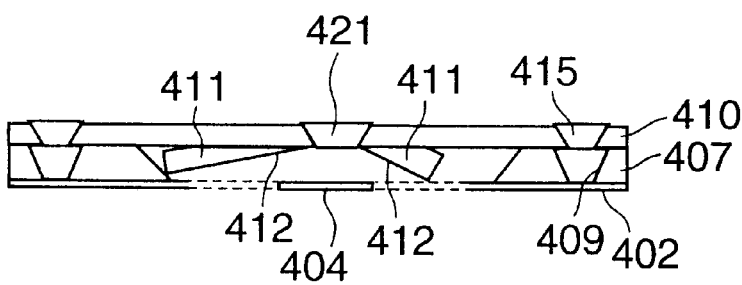
FIG. 33 is cross sectional view showing an important part of one of various embodiments of the mirror unit having a plurality of fixed mirrors.

FIG. 33 shows a mirror unit having the mirror members 411 adhered on a confronting mirror member 410. In FIG. 33, those parts which are the same as those corresponding parts in FIG. 32 are designated by the same reference numerals, and a description thereof will be omitted. Alignment holes 417 are formed in the torsion mirror substrate 402, alignment holes 409 are formed in the spacer 407, and alignment holes 415 are formed in the confronting mirror member 410. The torsion mirror substrate 402, the spacer 407 and the confronting mirror member 410 can be aligned with respect to each other using the alignment holes 417, 409 and 415.

Figure 34:
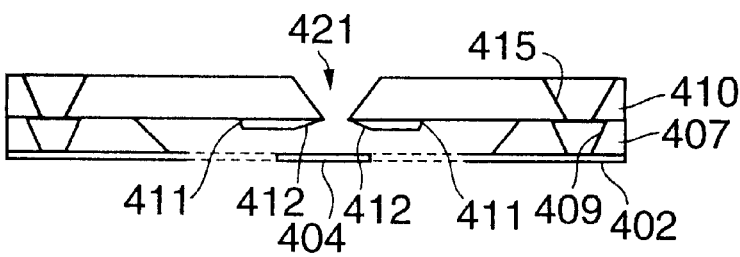
FIG. 34 is cross sectional view showing an important part of one of various embodiments of the mirror unit having a plurality of fixed mirrors.

FIG. 34 shows a mirror unit having the mirror members 411 adhered on the confronting mirror member 410. In FIG. 34, those parts which are the same as those corresponding parts in FIG. 33 are designated by the same reference numerals, and a description thereof will be omitted.

Figure 35:
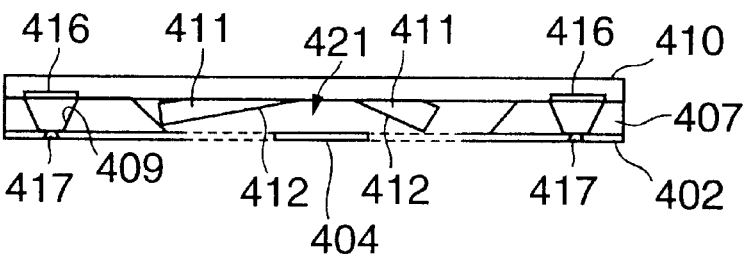
FIG. 35 is cross sectional view showing an important part of one of various embodiments of the mirror unit having a plurality of fixed mirrors.

FIG. 35 shows a mirror unit having the mirror members 411 adhered on the confronting mirror member 410 which is made of a sufficiently transparent material such as glass and resin. In FIG. 35, those parts which are the same as those corresponding parts in FIG. 33 are designated by the same reference numerals, and a description thereof will be omitted. In FIG. 35, alignment marks 416 are formed on the bottom surfaces of the confronting mirror member 410. Hence, the torsion mirror substrate 402, the spacer 407 and the confronting mirror member 410 can be aligned with respect to each other using the alignment holes 417 and 409 and the alignment marks 416.

Figure 36:
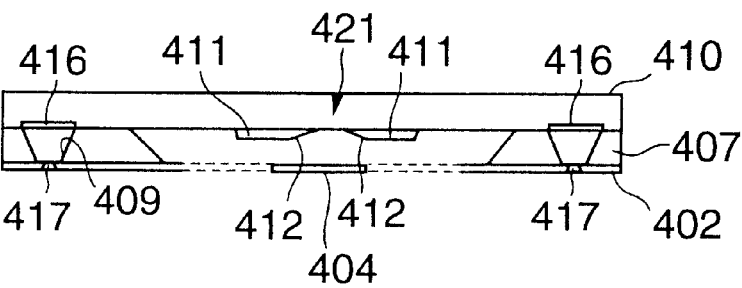
FIG. 36 is cross sectional view showing an important part of one of various embodiments of the mirror unit having a plurality of fixed mirrors.

FIG. 36 shows a mirror unit having the mirror members 411 adhered on the confronting mirror member 410 which is made of a sufficiently transparent material such as glass and resin. In FIG. 36, those parts which are the same as those corresponding parts in FIG. 35 are designated by the same reference numerals, and a description thereof will be omitted. In FIG. 36, the alignment marks 416 are formed on the bottom surfaces of the confronting mirror member 410. Hence, the torsion mirror substrate 402, the spacer 407 and the confronting mirror member 410 can be aligned with respect to each other using the alignment holes 417 and 409 and the alignment marks 416.

In FIGS. 33 through 36, the alignment holes or marks become smaller towards the torsion mirror substrate 402 when viewed from the confronting mirror member 410.

Figure 37B:
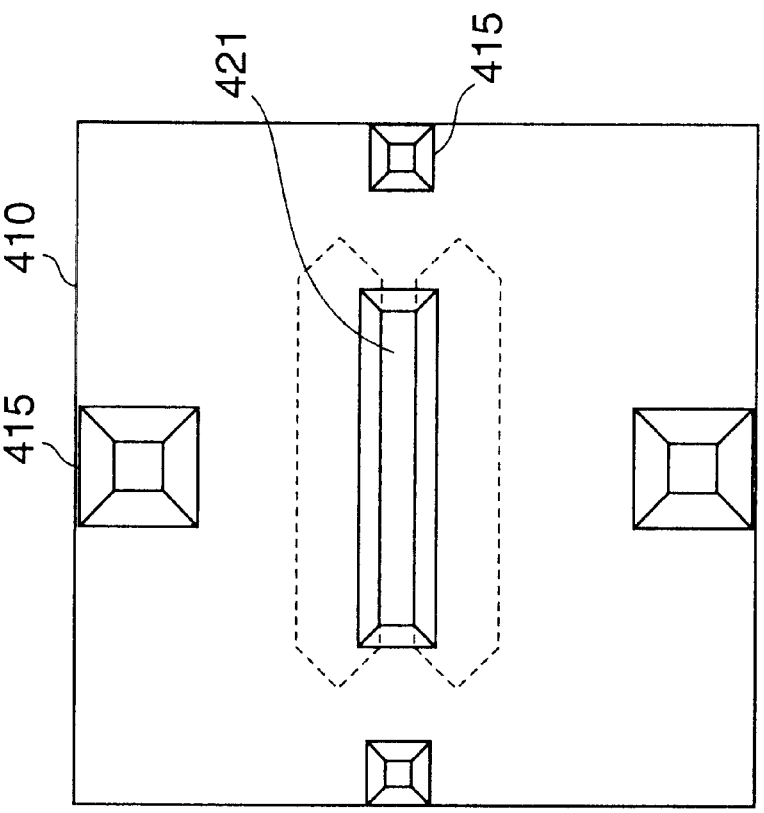
FIGS. 37A and 37B are plan views for explaining members which are produced by the methods described in conjunction with FIGS. 27A through 27H or FIGS. 29A through 29H, for the mirror unit shown in FIG. 34.
Figure 37A:
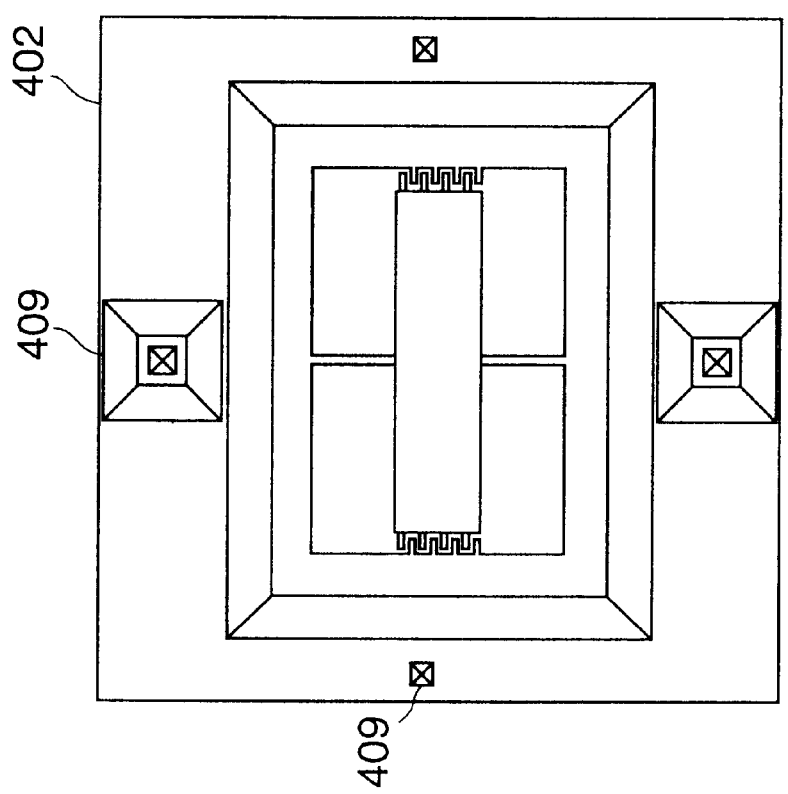

FIGS. 37A and 37B are plan views for explaining members which are produced by the methods described above in conjunction with FIGS. 27A through 27H or FIGS. 29A through 29H and are assembled in the mirror unit, for the mirror unit shown in FIG. 34. In addition, FIGS. 38A through 38C are diagrams for explaining the assembling of the mirror unit shown in FIG. 34.

FIG. 38A shows a plan view of the mirror unit which is assembled by bonding the torsion mirror substrate 402 shown in FIG. 37A, the spacer 407 and the confronting mirror member 410 shown in FIG. 37B. FIG. 38B shows a cross sectional view of the structure shown in FIG. 38A along a line X—X, and FIG. 38C shows a cross sectional view of the structure shown in FIG. 38A along a line Y—Y.

Further, the present invention is not limited to these embodiments, but various variations and modifications may be made without departing from the scope of the present invention.

What is claimed is:

1. An optical deflecting unit for deflecting a light beam in a main scan direction, comprising:

a torsion mirror which is pivotable about an axis and having a deflecting reflection surface which receives the light beam at an incident angle inclined with respect to a plane which is perpendicular to the axis and the deflecting reflection surface; and at least one fixed mirror surface confronting said torsion mirror and arranged so that the light beam is reflected between said torsion mirror and said at least one fixed mirror surface a plurality of times, and a moving direction of a reflection position of the light beam on said torsion mirror in a sub scan direction reverses, said sub scan direction being perpendicular to the main scan direction.

2. The optical deflecting unit as claimed in claim 1, further comprising:

an opening formed between a pair of mirror surfaces through which the light beam is input towards said torsion mirror and through which the reflected light beam is output as a deflected light beam.

3. The optical deflecting unit as claimed in claim 2, further comprising:

a first substrate on which said torsion mirror is pivotally supported; and a second substrate having said pair of mirror surfaces, said opening penetrating said second substrate.

4. The optical deflecting unit as claimed in claim 2, further comprising:

a first substrate on which said torsion mirror is pivotally supported; and a second substrate made of a sufficiently transparent material and having said pair of mirror surfaces, said second substrate sealing said torsion mirror, said opening being formed by a light transmitting portion of said second substrate between said pair of mirror surfaces.

5. The optical deflecting unit as claimed in claim 2, wherein a diameter of the light beam is restricted by an edge of said opening when the light beam is input and/or when the light beam is output from the optical deflecting unit.

6. The optical deflecting unit as claimed in claim 3, further comprising:

a spacer interposed between said first and second substrates, each of said first and second substrates and said spacer having alignment holes which are matched when bonding said first and second substrate and said spacer, said alignment holes being smaller towards said first substrate from said second substrate via said spacer.

7. The optical deflecting unit as claimed in claim 4, further comprising:

a spacer interposed between said first and second substrates and having alignment holes, said first substrate having alignment holes, said second substrate having alignment marks, said alignment marks of said second substrate being matched with the alignment holes of said spacer and said first substrate when bonding said first and second substrate and said spacer, said alignment marks and said alignment holes being smaller towards said first substrate from said second substrate via said spacer.

8. The optical deflecting unit as claimed in claim 1, wherein said at least one fixed mirror surface is formed by a substrate surface having a crystal orientation [111].

9. An optical deflecting unit for deflecting a light beam in a main scan direction, comprising:

a first substrate pivotally supporting a torsion mirror having a deflecting reflection surface;

a second substrate disposed to confront said first substrate, said second substrate having a bonding surface parallel to said first substrate and at least one fixed mirror surface which is inclined in a sub scan direction with respect to the deflecting reflection surface, said sub scan direction being perpendicular to said main scan direction, said light beam first reaching said deflecting reflection surface and being reflected a plurality of times between said deflecting reflection surface and said at least one fixed mirror surface before being output as a deflected light beam.

10. The optical deflecting unit as claimed in claim 9, wherein an inclination angle of said at least one fixed mirror surface with respect to the bonding surface of said second substrate is defined by a slice surface and a crystal orientation [111] of said second substrate.

11. The optical deflecting unit as claimed in claim 9, further comprising:

a spacer disposed between said first and second substrates and forming a space in which said torsion mirror pivots.

12. The optical deflecting unit as claimed in claim 9, wherein said second substrate includes at least one opening through which the light beam enters and exists the optical deflecting unit.

13. The optical deflecting unit as claimed in claim 9, wherein said second substrate is made of a sufficiently transparent material and has a light transmitting portion through which the light beam enters and exists the optical deflecting unit.

14. The optical deflecting unit as claimed in claim 13, wherein said second substrate seals said torsion mirror.

15. The optical deflecting unit as claimed in claim 9, wherein said second substrate has a plurality of fixed mirror surfaces which are integrally formed thereon.

16. The optical deflecting unit as claimed in claim 9, further comprising:

a spacer interposed between said first and second substrates, each of said first and second substrates and said spacer having alignment holes or marks which are matched when bonding said first and second substrate and said spacer, said alignment holes or marks being smaller towards said first substrate from said second substrate via said spacer.

17. An optical scanning unit for scanning a body by a light beam in a main scan direction, comprising:

an optical deflecting unit which deflects a light beam in the main scan direction; and a lens system for imaging a deflected light beam from said optical deflecting unit on the body, said optical deflecting unit comprising:

a torsion mirror which is pivotable about an axis and having a deflecting reflection surface which receives the light beam at an incident angle inclined with respect to a plane which is perpendicular to the axis and the deflecting reflection surface; and at least one fixed mirror surface confronting said torsion mirror and arranged so that the light beam is reflected between said torsion mirror and said at least one fixed mirror surface a plurality of times, and a moving direction of a reflection position of the light beam on said torsion mirror in a sub scan direction reverses so as to reduce a skew of the deflected light beam, said sub scan direction being perpendicular to the main scan direction.

18. The optical scanning unit as claimed in claim 17, wherein said lens system includes a lens with a lens surface having a generatrix which connects vertexes of the lens surface and is curved in the sub scan direction, so as to correct a curve of a scanning line on the body.

19. An optical scanning unit for scanning a body by a light beam in a main scan direction, comprising:

an optical deflecting unit which deflects a light beam in the main scan direction; and a lens system for imaging a deflected light beam from said optical deflecting unit on the body, said optical deflecting unit comprising:

a first substrate pivotally supporting a torsion mirror having a deflecting reflection surface;

a second substrate disposed to confront said first substrate, said second substrate having a bonding surface parallel to said first substrate and at least one fixed mirror surface which is inclined in a sub scan direction with respect to the deflecting reflection surface so as to reduce a skew of the deflected light beam, said sub scan direction being perpendicular to said main scan direction, said light beam first reaching said deflecting reflection surface and being reflected a plurality of times between said deflecting reflection surface and said at least one fixed mirror surface before being output as the deflected light beam.

20. The optical scanning unit as claimed in claim 19, wherein said lens system includes a lens with a lens surface having a generatrix which connects vertexes of the lens surface and is curved in the sub scan direction, so as to correct a curve of a scanning line on the body.

21. An image forming apparatus comprising:

a photoconductive body;

an optical scanning unit which outputs a light beam which is deflected in a main scan direction; and a lens system for imaging the deflected light beam from said optical deflecting unit on said photoconductive body, said optical scanning unit comprising:

a torsion mirror which is pivotable about an axis and having a deflecting reflection surface which receives the light beam at an incident angle inclined with respect to a plane which is perpendicular to the axis and the deflecting reflection surface; and at least one fixed mirror surface confronting said torsion mirror and arranged so that the light beam is reflected between said torsion mirror and said at least one fixed mirror surface a plurality of times, and a moving direction of a reflection position of the light beam on said torsion mirror in a sub scan direction reverses so as to reduce a skew of the deflected light beam, said sub scan direction being perpendicular to the main scan direction.

22. An image forming apparatus comprising:

a photoconductive body;

an optical scanning unit which outputs a light beam which is deflected in a main scan direction; and a lens system for imaging the deflected light beam from said optical deflecting unit on said photoconductive body, said optical scanning unit comprising:
- a first substrate pivotally supporting a torsion mirror having a deflecting reflection surface;
- a second substrate disposed to confront said first substrate, said second substrate having a bonding surface parallel to said first substrate and at least one fixed mirror surface which is inclined in a sub scan direction with respect to the deflecting reflection surface so as to reduce a skew of the deflected light beam, said sub scan direction being perpendicular to said main scan direction, said light beam first reaching said deflecting reflection surface and being reflected a plurality of times between said deflecting reflection surface and said at least one fixed mirror surface before being output as the deflected light beam.

23. A method of producing an optical unit which deflects a light beam in a main scan direction, comprising the steps of:

(a) preparing a first substrate pivotally supporting a torsion mirror having a deflecting reflection surface;

(b) disposing a second substrate on said first substrate via a spacer, said second substrate having a bonding surface parallel to said first substrate and at least one fixed mirror surface which is inclined in a sub scan direction with respect to the deflecting reflection surface so as to reduce a skew of the deflected light beam, said sub scan direction being perpendicular to said main scan direction, said light beam first reaching said deflecting reflection surface and being reflected a plurality of times between said deflecting reflection surface and said at least one fixed mirror surface before being output as the deflected light beam; and (c) bonding said first and second substrates and said spacer by matching alignment holes or marks in each of said first and second substrates and said spacer, said alignment holes or marks being smaller towards said first substrate from said second substrate via said spacer.

24. The method of producing the optical unit as claimed in claim 23, further comprising the step of:

(d) defining an inclination angle of said at least one fixed mirror surface with respect to the bonding surface of said second substrate by a slice surface and a crystal orientation [111] of said second substrate.

* * * * *